United States Patent [19]
Ichiki et al.

[11] Patent Number: 5,400,506
[45] Date of Patent: Mar. 28, 1995

[54] METHOD AND APPARATUS FOR AUTOMATICALLY ASSEMBLING SIDE GEARS, PINIONS AND PINION SHAFT WITHIN DIFFERENTIAL CASE

[75] Inventors: Manabu Ichiki; Masatoshi Kanazawa; Tsutomu Ishikawa, all of Toyota, Japan

[73] Assignee: Toyota Jidosha Kabushiki Kaisha, Toyota, Japan

[21] Appl. No.: 155,552

[22] Filed: Nov. 22, 1993

[30] Foreign Application Priority Data

Nov. 25, 1992 [JP] Japan .................................. 4-337980

[51] Int. Cl.⁶ ............................................ B21D 53/28
[52] U.S. Cl. ................................. 29/893.1; 29/791
[58] Field of Search ................... 29/893.1, 893.2, 711, 29/791; 475/220, 230

[56] References Cited

FOREIGN PATENT DOCUMENTS 63-200935   8/1988   Japan .
3270830   12/1991   Japan .................................. 29/893.1
4-25659   1/1992   Japan .

Primary Examiner—P. W. Echols
Attorney, Agent, or Firm—Oblon, Spivak, McClelland, Maier, & Neustadt

[57] ABSTRACT

Method and apparatus for automatic assembling of a differential gear device, wherein a pair of pinions are introduced by a pinion support device into the chamber of a differential case through respective openings formed through the case, and the pinions are rotatably held between a pair of side gears disposed within the chamber, at respective symmetrical positions which are symmetrical with each other with respect to an axis of rotation of the side gears, so that the pinions are brought into meshing engagement with the side gears by a gear meshing device while one of the side gears is rotated about its axis by a rotating device and while the pinions are held at the respective symmetrical positions.

33 Claims, 18 Drawing Sheets

METHOD AND APPARATUS FOR AUTOMATICALLY ASSEMBLING SIDE GEARS, PINIONS AND PINION SHAFT WITHIN DIFFERENTIAL CASE

BACKGROUND OF THE INVENTION

1. Field of the Invention

The present invention relates to a method of and an apparatus for automatically assembling components within a differential case, to manufacture a differential gear device or unit which provides a major portion of a differential assembly.

2. Discussion of the Related Art

A differential gear device used as a final reduction gear on a motor vehicle, for example, employs a housing structure known as a differential case. The differential case accommodates a pair of opposed differential side gears (having a relatively large diameter) rotatable about an axis, and a pair of differential pinions (having a relatively small diameter) which are interposed between the side gears and mesh with these side gears. The differential pinions are supported by a pinion shaft or pin rotatably thereon about an axis perpendicular to the axis of rotation of the side gears. Where the differential gear device is used for a motor vehicle, the differential case is provided with a ring gear (a speed reduction gear having a relatively large diameter) attached thereto, and is rotated with the ring gear, about the axis of the differential side gears, so that power from the drive shaft is distributed to the right and left drive wheels connected to the respective differential side gears.

For improving the efficiency in assembling a differential assembly as described above, an automatic assembling apparatus is proposed as disclosed in JP-A-63-200935, for example. Up to the present, however, automatic assembling of the components within the differential case to provide a differential gear device which constitutes a principal part of the differential assembly has been infeasible because of comparatively small or substantially no clearances between the components, and the necessity of inserting the components into the differential case through openings formed through the case. Thus, there has been a long-felt need of automating the assembling of the differential gear device.

Described in detail, the differential gear device is assembled by first fixing a differential case upright, and holding a pair of differential side gears at respective positions in the upper and lower portions of the interior chamber of the upright differential case, by using suitable jigs or fixtures. Then, a pair of differential pinions are introduced into the differential case, for meshing engagement with the side gears, with part-spherical washers being placed on the rear or outer end faces of the pinions. For inserting a pinion shaft so as to rotatably support the pinions, the meshing differential side gears and pinions are rotated relative to the differential case about the axis of rotation of the side gears, with the washers held in place on the differential pinions, so that the pinions are moved relative to the case, so as to be aligned with concentric pinion shaft holes formed through the wall of the differential case. Then, the pinion shaft is inserted through the pinion shaft holes, pinion gears and washers, from the outside of the differential case, and a lock pin is driven into the pinion shaft through the wall of the differential case, to lock the shaft to the case.

The above assembling procedure requires the two differential pinions to mesh with the differential side gears at respective positions which are symmetrical with each other with respect to the axis of rotation of the side gears in a plane perpendicular to that axis, namely, at diametrically opposite positions on a circle whose center lies on the axis of the side gears. Further, the part-spherical washers should be retained in place on the outer end faces of the pinions by adhesion with an oil applied therebetween, while and until the pinions are moved into alignment with the pinion shaft holes, with the washers sliding on the inner wall surface of the differential case. The washers tend to be displaced relative to the pinions, during movement of the pinions relative to the differential case, with a result of misalignment of the washers with respect to the pinion shaft holes. Consequently, the assembling procedure requires a considerable time and a high level of skill for inserting the pinion shaft through the case, pinions and washers, in particular. According to a conventional manual assembling procedure, an experienced worker generally requires as long as approximately one minute for completing the assembling of one differential gear device, for instance.

SUMMARY OF THE INVENTION

It is therefore a first object of the present invention to provide a method of automatically and efficiently assembling a differential gear device, in a reduced length of time.

It is a second object of the invention to provide an apparatus suitable for practicing the method.

The above first object may be achieved according to a first aspect of the present invention, which provides a method of automatically assembling a differential gear device including a differential case with a chamber formed therein, and components which are accommodated in the chamber and which include a pair of opposed differential side gears, a pair of opposed differential pinions interposed between and meshing with the side gears, and a differential pinion shaft for rotatably supporting the pinions, the differential case being adapted to be disposed in a differential assembly, rotatably with a ring gear about a first axis, the side gears being rotatable about the first axis, while the differential pinions being rotatable about a second axis perpendicular to the first axis, the case having a pair of openings which communicate with the chamber and are open to an external space outside the case and which are opposed to each other in a direction perpendicular to the second axis, in a plane parallel to the second axis and perpendicular to the first axis, the method comprising the steps of: (a) introducing the pinions into the chamber through the pair of openings, respectively, and rotatably holding the pinions between the differential side gears disposed within the chamber, at respective symmetrical positions which are symmetrical with each other with respect to the first axis in the plane; (b) rotating one of the side gears about the first axis; and (c) effecting meshing engagement of the pinions with the pair of side gears, while holding the pinions at the respective symmetrical positions.

The second object indicated above may be achieved according to a second aspect of this invention, which provides an apparatus for automatically assembling a differential gear device including a differential case with a chamber formed therein, and components which are accommodated in the chamber and which include a pair of opposed differential side gears, a pair of opposed differential pinions interposed between and meshing with the side gears, and a differential pinion shaft for rotatably supporting the pinions, the differential case being adapted to be disposed in a differential assembly, rotatably with a ring gear about a first axis, the side gears being rotatable about the first axis, while the differential pinions being rotatable about a second axis perpendicular to the first axis, the case having a pair of openings which communicate with the chamber and are open to an external space outside the case and which are opposed to each other in a direction perpendicular to the second axis, in a plane parallel to the second axis and perpendicular to the first axis, the apparatus comprising: (i) a pinion support device for introducing the pinions into the chamber through the pair of openings, respectively, and rotatably holding the pinions between the differential side gears disposed within the chamber, at respective symmetrical positions which are symmetrical with each other with respect to the first axis in the plane; (ii) a side gear rotating device for rotating one of the side gears about the first axis; and (iii) a gear meshing device for effecting meshing engagement of the pinions with the pair of side gears, while holding the pinions at said respective symmetrical positions.

According to the present invention as described above, the pinion gears are rotatably held between the side gears within the chamber of the differential case, at the respective symmetrical positions, and are automatically brought into meshing engagement with one of the side gears while this one side gear is rotated about the first axis. This arrangement permits the pair of pinions to mesh with the side gears, at the respective positions which are symmetrical with each other with respect to the axis of rotation of the side gears, in the plane perpendicular to this rotation axis. Accordingly, by moving the pinions to the position for their alignment with the second axis, the pinion shaft can be efficiently and easily inserted through the pinions and the wall of the differential case.

According to one preferred form of the invention, the above-indicated one side gear is rotated in a predetermined one direction, and the pair of pinions at the symmetrical positions are forced onto that one side gear during rotation of the same side gear in the predetermined the direction, whereby the pinions are brought into meshing engagement with that one side gear. This preferred method may be practiced by one form of the apparatus, which comprises a controller for controlling the side gear rotating device so as to rotate the above-indicated one side gear in the predetermined one direction, and in which the gear meshing device comprises a pinion pressing device, which is controlled by the controller to force the pinions onto the above-indicated one side gear during rotation of that one side gear in the predetermined one direction, for thereby effecting the meshing engagement of the pinions with that one side gear. This arrangement assures easy meshing engagement of the pinions with the rotated one side gear, before the pinions are also meshed with the other side gear.

In one arrangement of the above preferred form of the invention, the above-indicated one side gear is rotated in a direction opposite to the above-indicated predetermined one direction, after the pinions have meshed with the above-indicated one side gear, and the meshing engagement of the pinions with the other side gear is effected by bringing the pinions into contact with that other side gear. That is, the controller operates the side gear rotating device to rotate the above-indicated one side gear in the opposite direction after the meshing engagement of the pinions with that one side gear, and the gear meshing device comprises a device for bringing the pinions into contact with the other side gear to thereby effect meshing engagement of the pinions with that other side gear.

According to another preferred form of the present invention, the meshing side gears and pinions are rotated relative to the differential case about the first axis (axis of rotation of the side gears), until the pinions are aligned with the second axis (axis of the pinion shaft). To this end, a rotating device is provided for rotating the side gears and the pinions after the meshing engagement with each other, relative to the case about the first axis, so that the pinions are moved into alignment with the second axis.

According to an advantageous feature of the above form of the invention, the pair of side gears are biased toward each other to force the pinions toward an inner surface defining the chamber of the differential case, while the side gears and the pinions are rotated about the first axis relative to the case. This is accomplished by biasing means for biasing the pair of side gears toward each other to thereby force the pinions toward the inner surface of the case, while the side gears and the pinions are rotated by the rotating device. Since the pinions are forced against the inner surface of the case by the side gears biased toward each other, a pair of part-spherical washers which usually adhere to the rear or outer end faces of the pinions due to an oil or grease are effectively protected from undesirable displacement or dislocation relative to the pinions during movement of the pinions into alignment with the second axis. This, the present feature permits efficient automatic insertion of the pinion shaft, with the pinions and washers being accurately aligned with the second axis, whereby the automatic assembling efficiency of the differential gear device is significantly improved.

For instance, the biasing means may be constituted by the weight of an upper one of the side gears where the assembling is effected with the differential case positioned upright such that the first axis extends in the vertical direction. In this case, the side gears are opposed to each other in the vertical direction, and the weight of the upper side gear acts on the pinions whereby the pinions are forced against the inner surface of the case in the opposite directions in the plane perpendicular to the first axis, namely, the rotation axis of the side gears. To enable the upper side gear to act as the biasing means, suitable holding means may be provided for holding the upper side gear until the meshing engagement of the side gears and the pinions is completed, and for releasing the upper side gear after the meshing engagement such that the weight of the upper side gear acts on the pinions. However, the biasing means may consist of any biasing, elastic or resilient member such as a spring, which acts on at least one of the two side gears.

According to another advantageous feature of the above form of the invention in which the side gears and pinions are rotated about the first axis until the pinions are moved into alignment with the second axis, each of the pinions is rotatably held in a first angular position about the first axis, with a first and a second pinion holder extending through a corresponding one of the openings of the case into the chamber of the case, such that the second pinion holder is located adjacent to one of opposite ends of the corresponding opening as seen in the direction of rotation of the pinions. Then, the second pinion holder is retracted away from each pinion while the pinion is left within the chamber in the first angular position. The side gears and the pinions are subsequently rotated relative to the case about the first axis to move each pinion from the first angular position to a second angular position in which the first pinion holder is located adjacent to the above-indicated one end of the corresponding opening of the case. The first pinion holder is then retracted away from the pinion while the pinion is left within the chamber in the second angular position, and the side gears and pinions are then rotated relative to the case about the first axis to move the pinions from the second angular position to a third angular position in which the pinions are aligned with the second axis.

The above arrangement for moving the pinions from the first angular position (in which the pinion holders can extend into the chamber of the case through the openings) to the third angular position for alignment of the pinions with the second axis may be realized by a preferred form of the apparatus wherein the rotating device for rotating the side gears and pinions about the first axis comprises: a first pinion holder and a second pinion holder each of which is movable between an advanced position for rotatably holding each pinion within the chamber of the case, and a retracted position in the external space outside the case, the first and second pinion holders being movable to the advanced position through the corresponding opening of the case; a first and a second actuator for operating the first and second pinion holders, respectively; a drive source for rotating the side gears and the pinions relative to the case about the first axis, to move the pinions to the third angular position; and a controller for controlling the first and second pinion holders, first and second actuators and drive source.

According to the above arrangement, the first and second pinion holders which cooperate to rotatably hold each pinion are sequentially retracted from the advanced position to the retracted position in the process of movement of the pinions to the third angular position for alignment with the second axis. This arrangement assures smooth movement of the pinions into alignment with the second axis, without an interference of the pinion holders with the differential case, while permitting the pinions to be initially rotatably held within the chamber of the case by the pinion holders placed in the advanced position. In the third angular position, the pinions are disposed in a space defined by the side gears and the inner surfaces of the wall portions of the case through which the shaft holes are formed for the pinion shaft. That is, the pinions placed in the third angular position are not visible from outside the case. However, the above arrangement permits automatic positioning of the pinions in alignment with the shaft holes at the third angular position, without the pinion holders interfering with any portion of the differential case.

It is to be appreciated that the method or apparatus according to the present invention has the two or more features which have been discussed above.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
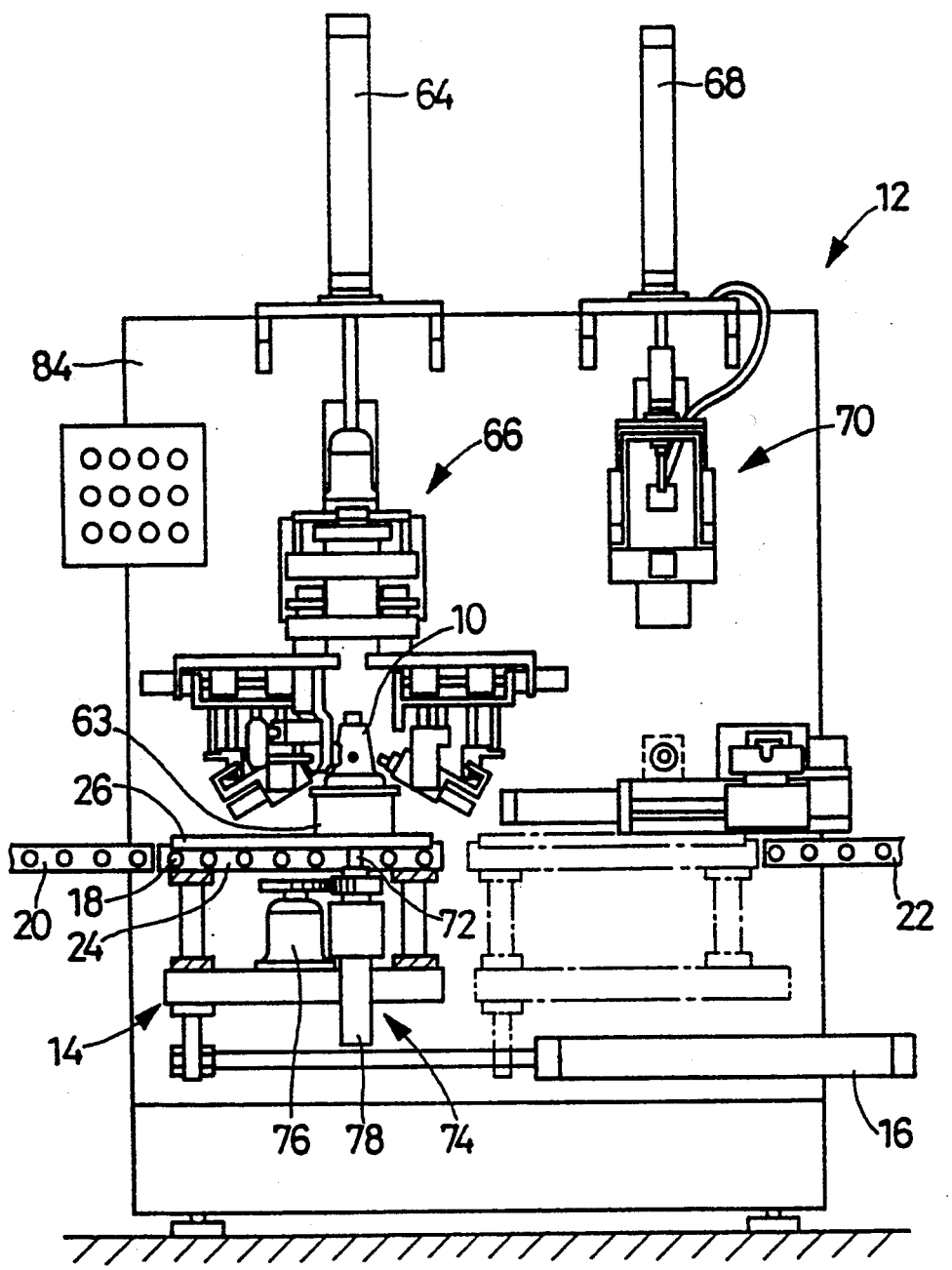
FIG. 1 is a front elevational view of one embodiment of an automatic assembling apparatus of the present invention for assembling a differential gear device.
Figure 2:
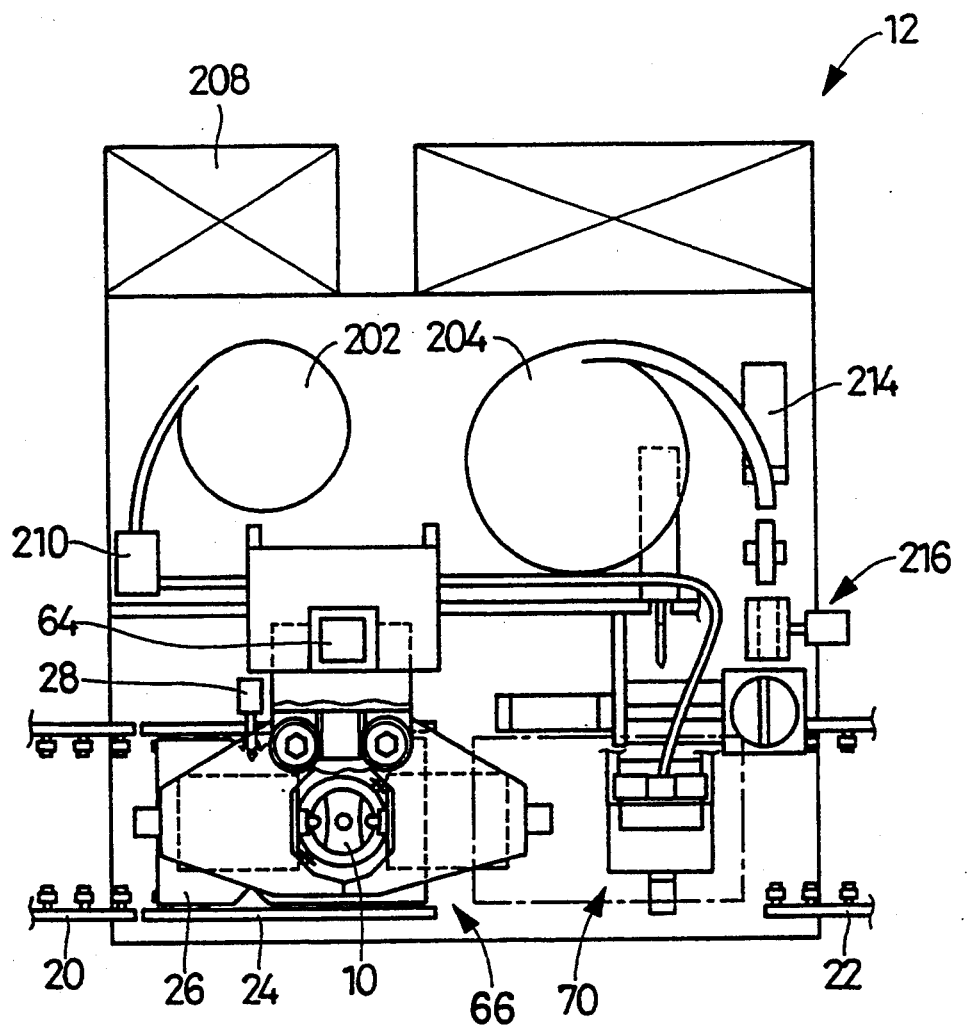
FIG. 2 is a plan view of the apparatus of FIG. 1.

Referring first to the front elevational and plan views of FIGS. 1 and 2, there is illustrated in general one example of an automatic assembling apparatus constructed to automatically assemble a differential gear device including a differential case 10, according to one embodiment of this invention.

The automatic assembling apparatus, Which is indicated generally at 12 in FIGS. 1 and 2, includes a carriage 14 supported and guided by a guide rail (not shown) movably in a horizontal direction, and a reciprocating cylinder 16 for reciprocating the carriage 14 between a predetermined first and a second assembling position. The carriage 14 is provided with a pallet support member 24 for supporting a pallet 26 thereon, and a pallet stop 28 (FIG. 2) for positioning the pallet 26 on the pallet support member 24. The support member 24 has a multiplicity of rollers 18 for movably supporting the pallet 26, and has the same height or level as a loading or in-coming conveyor 20 and an unloading or outgoing conveyor 22. The pallet stop 28 has a projection engageable with a recess formed in the pallet 26.

Prior to an automatic assembling operation on the present apparatus 12, the differential case 10 is fixed in position on the pallet 26, and the pallet 26 is transferred from the loading conveyor 20 onto the carriage 14 located in the first assembling position. After the assembling operation on the differential case 10 is completed at the second assembling position, the pallet 26 With the case 10 mounted thereon is transferred from the second assembling position onto the unloading conveyor 22.

Figure 3:
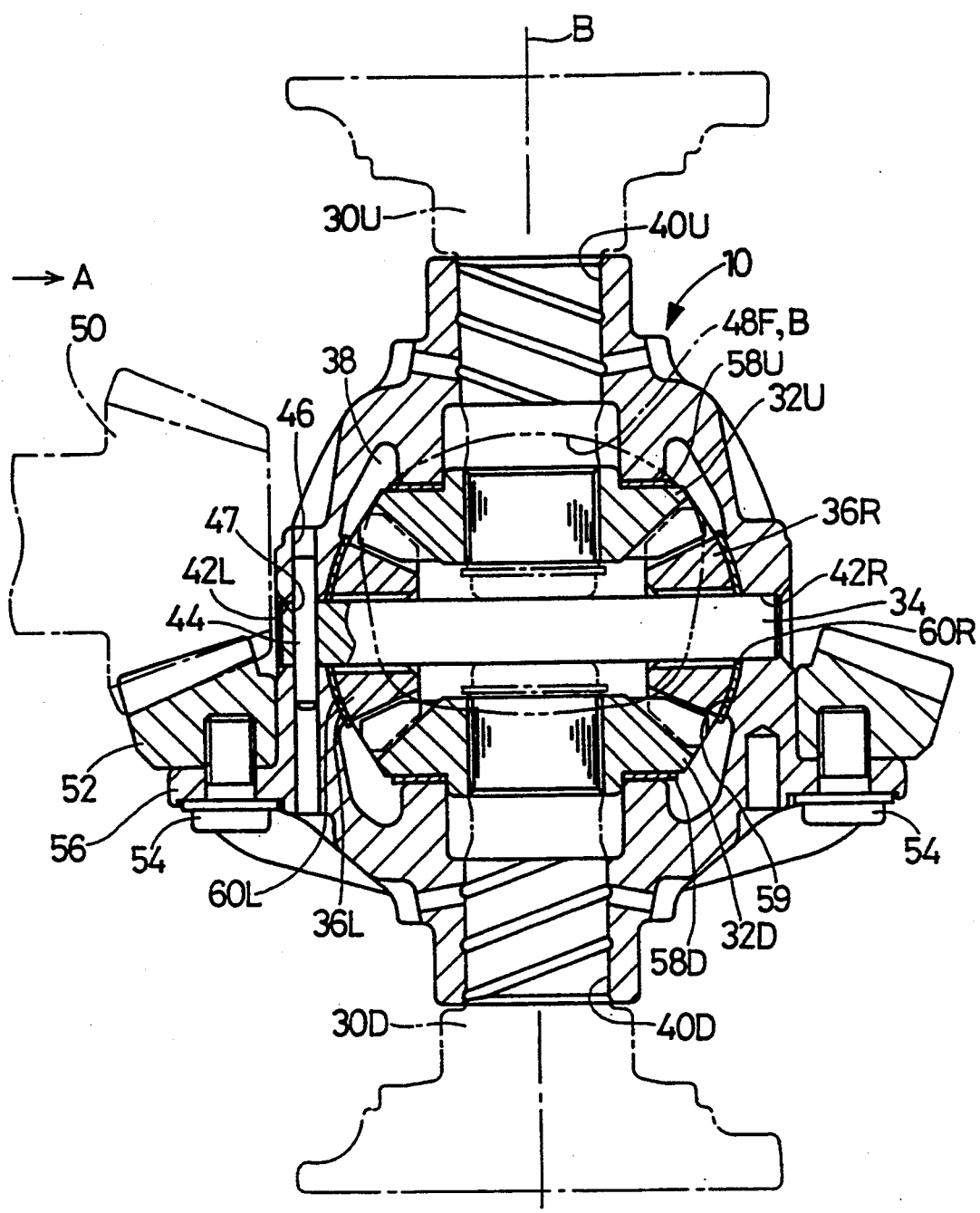
FIG. 3 is an elevational view in longitudinal cross section of a differential gear device including a differential case, and components incorporated within the case, such as differential pinions and side gears.
Figure 4:
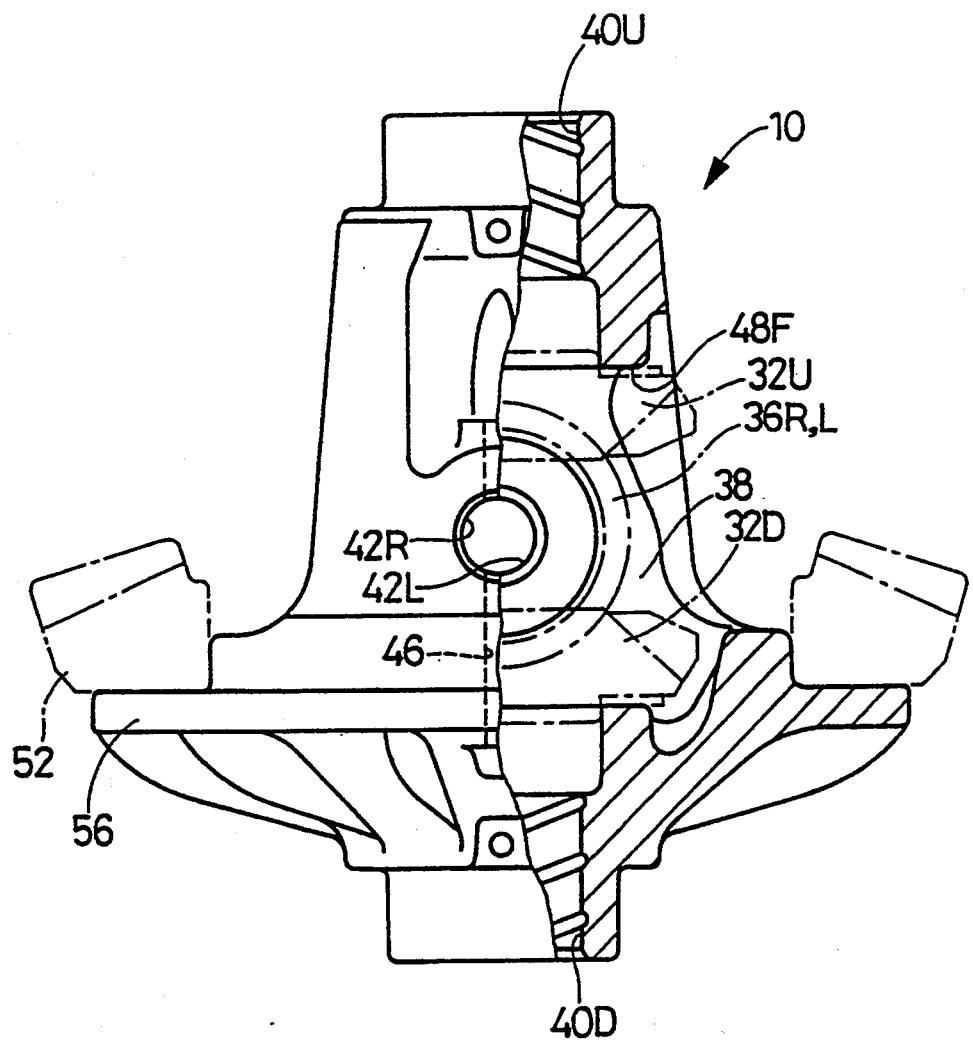
FIG. 4 is a partly cut-away front elevational view illustrating the differential gear device of FIG. 3.
Figure 5:
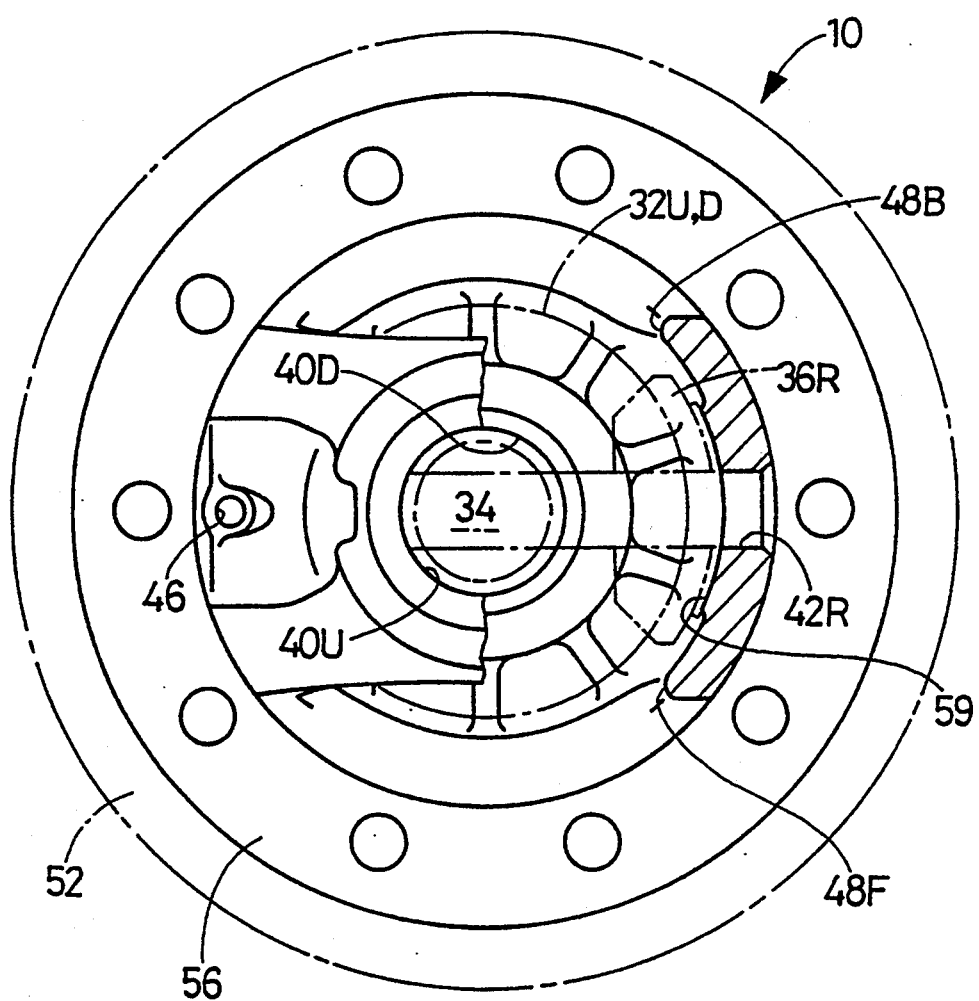
FIG. 5 is a partly cut-away plan view of the differential gear device of FIG. 3.

The differential case 10 is constructed as shown in FIGS. 3–5. The front elevational view in longitudinal cross section of FIG. 3 shows components incorporated in the differential case 10. FIGS. 4 and 5 are partly cut-away side elevational and plan views, respectively, of the differential case 10 of FIG. 3. The side elevational view of FIG. 4 is taken in the direction indicated by arrow A in FIG. 3.

The differential case 10 and the components incorporated therein by the present apparatus 12 constitute a differential gear device which is installed within a housing of a final reduction gear assembly of a motor vehicle, such that the differential case 10 is rotatable about an axis B of rotation of axles 30U and 30D to which the drive wheels of the vehicle are secured. The differential case 10 has a chamber 38 in which there are rotatably accommodated a pair of differential side gears 32U and 32D in the form of opposed bevel gears, a pair of differential pinions 36L and 36R, and a pinion shaft 34 on which the differential pinions 36L, 36R are rotatably supported. The differential case 10 also has a pair of axle holes 40U and 40D which receive the end portions of the axles 30U and 30D splined to the respective side gears 32U and 32D, a pair of shaft holes 42L and 42R in which the end portions of the pinion shaft 34 are fixed received, and a pin hole 46 which is aligned with a pin hole 47 formed through one of the end portions of the pinion shaft 34. The pin holes 46, 47 receive a lock pin 44 for locking the pinion shaft 34. The differential case 10 further has a pair of openings 48F and 48B formed through its wall, so as to be opposed to each other in a direction perpendicular to the direction of extension of the pinion shaft 34, in a plane parallel to the pinion shaft 34 and perpendicular to the axis B. The openings (48F, 48B) communicate with the chamber 38, and are open to the external space outside the case 10.

The case 10 includes a flange 56 which extends outwardly of the wall defining the chamber 38. To this flange 56, there is fixed a ring gear 52 by screws 54. The ring gear 52 is provided for meshing engagement with a driving pinion 50 which is adapted to receive an output of an engine of the vehicle. The received engine output is distributed to the left and right axles 30U and 30D through the differential gear unit 10, 32, 34, 36, 52. Between the differential side gears 32U, 32D and the inner surfaces of the differential case 210, there are interposed respective disk washers 58U and 58D. Similarly, part-spherical washers 60L and 60R are interposed between the differential pinions 36L, 36R and part-spherical inner surfaces 59 of the case 10.

Referring back to FIGS. 1 and 2, the differential case 10 is fixed on the pallet 26 via a cylindrical fixture 63, in an upright posture such that the rotation axis B of the side gears 32U, 32D extends in the vertical direction. The side gears 32U and 32D are introduced into the case 10 through the openings 48, together with the disk washers 58U, 58D, by a worker or an operator of the apparatus 12. These side gears 32U, 32D are supported at respective predetermined positions in the manners explained below. The upper side gear 32U is held by a gear holding jig 62 (FIG. 16) inserted through the upper axle hole 40U.

Above the pallet 26 placed in the first assembling position, there is provided a first working head 66 which is vertically moved by a first vertical cylinder 64. The first working head 66 performs various operations on the differential case 10 positioned on the fixture 63 on the pallet 26 in the first assembling position. Briefly described, the first working head 66 is adapted to insert the pair of differential pinions 36L, 36R into the chamber 38 of the case 10, through the openings 48, for automatic meshing engagement with the pair of side gears 32U, 32D. The first working head 66 is also adapted to rotate the mutually meshing pinions and side gears 36L, 36R, 32U, 32D, relative to the case 10, so that the pinions 36L, 36R are moved to diametrically opposite positions of the case 10 at which the bores of the pinions 36L, 36R are aligned with the shaft holes 42L, 42R of the case 10, so that the pinion shaft 34 can be inserted so as to extend through the shaft holes 42L, 42R, washers 60L, 60R and pinions 36L, 36R, as described below in detail.

Above the pallet 26 placed in the second assembling position, there is disposed a second working head 70 which is vertically moved by a second vertical cylinder 68. The second working head 70 functions to automatically insert the pinion shaft 34 through the case 10 and the pinions 36L, 36R, and automatically drive the lock pin 44 into the pin hole 46 of the case 10 and the pin hole 47 of the pinion shaft 34, for locking the shaft 34 in position.

The carriage 14 is equipped with a gear rotating device 72 for rotating the lower side gear 32D, for the purpose which will become apparent from the following description. The gear rotating device 74 includes a chucking device 72 for chucking the side gear 32D at the central bore thereof. The rotating device 74 includes a motor 76 for rotating the chucking device 72, and an elevating cylinder 78 for elevating the chucking device 72 so that the chucking end of the device 74 is inserted into the bore of the side gear 32D, through the pallet 26, cylindrical fixture 63 and lower axle hole 40D of the case. The rotating device 74 also includes a chucking cylinder for activating the chucking end of the chucking device 72.

Figure 6:
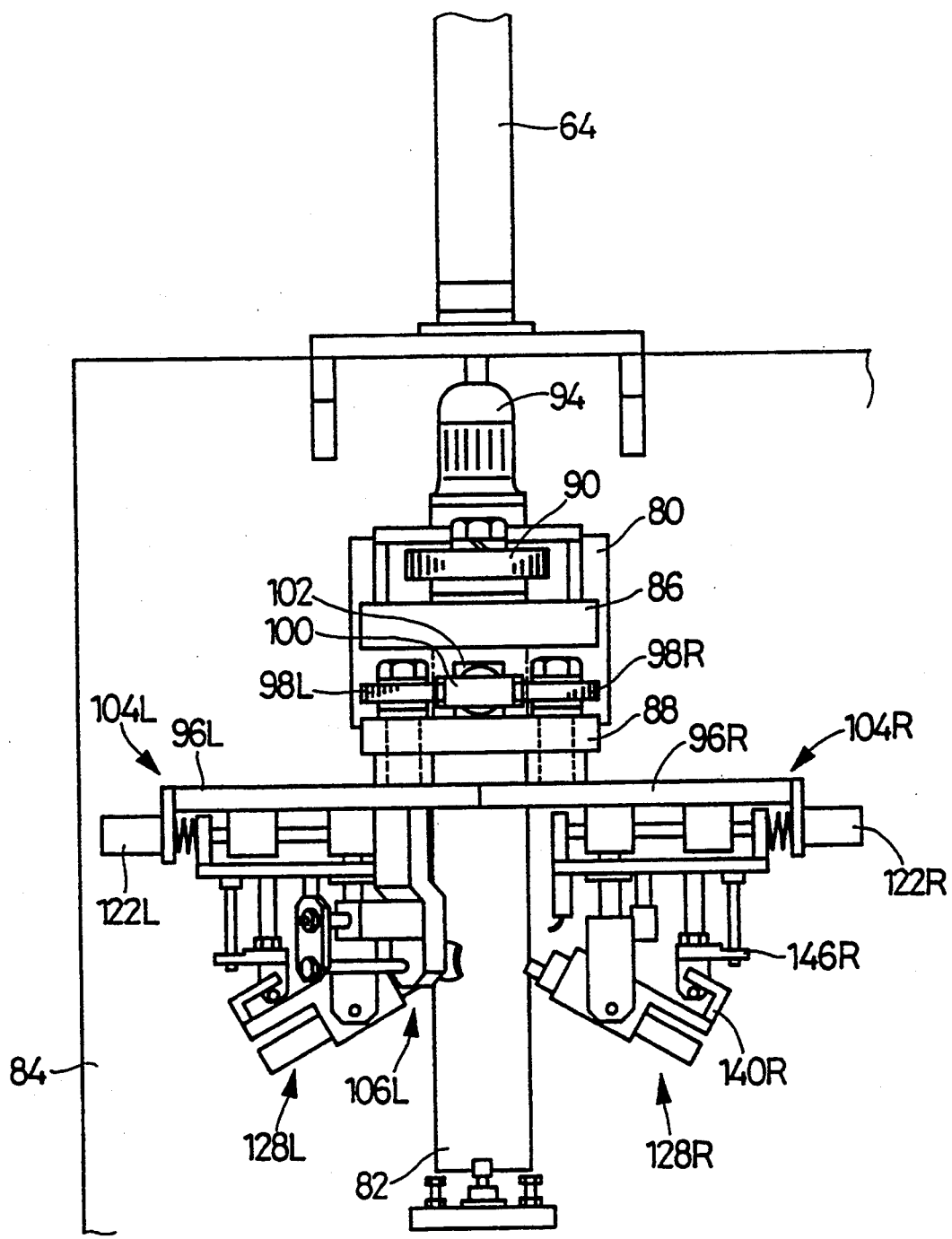
FIG. 6 is an enlarged front elevational view showing a first working head of the apparatus of FIG. 1.
Figure 7:
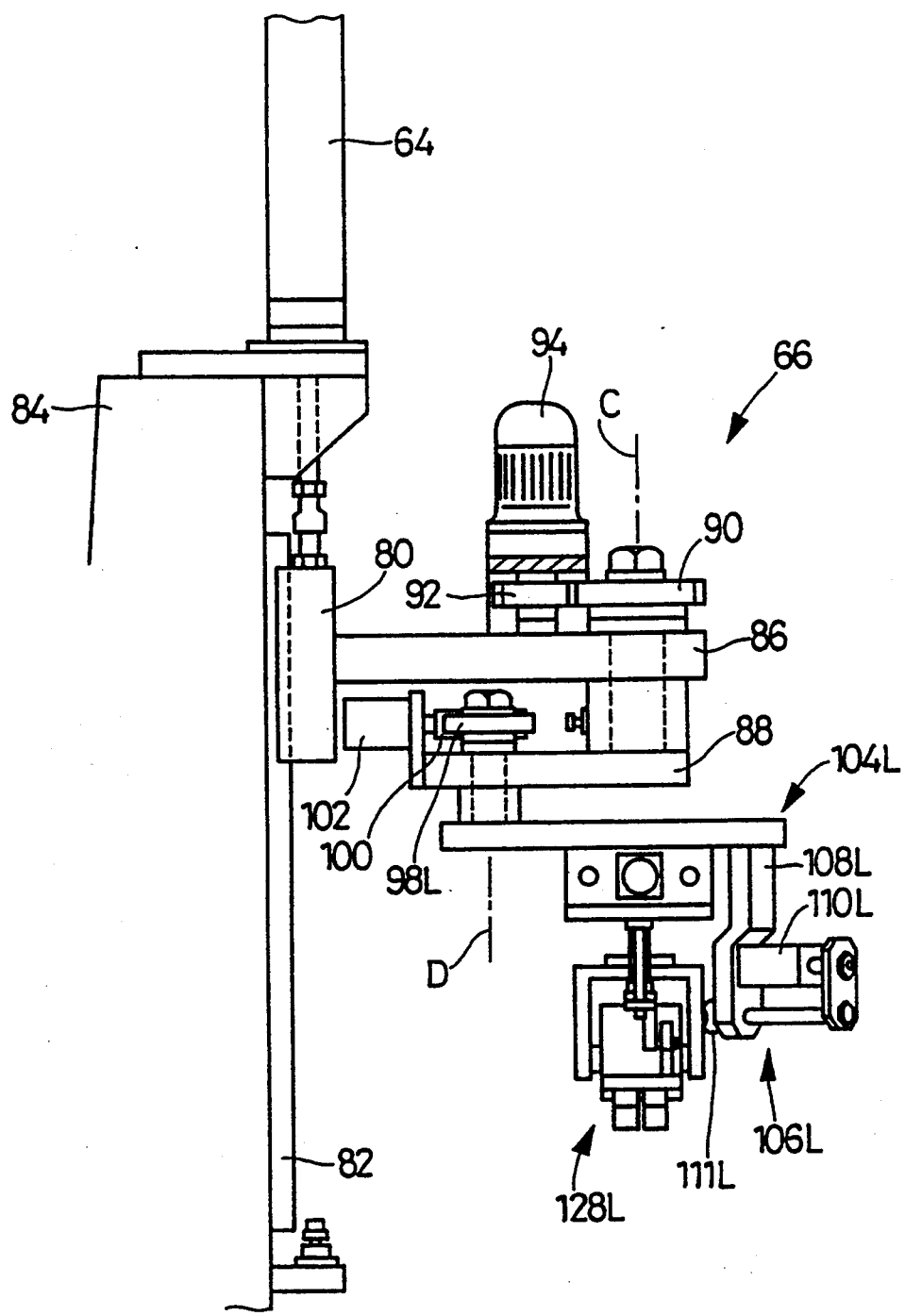
FIG. 7 is a side elevational view of the first working head of FIG. 6.

Reference is now made to FIGS. 6 and 7, which show the first working head 66 fixed to a first movable member 80. This movable member 80 is vertically movable by the first vertical cylinder 64 while being guided by a first guide rail 82 secured to a frame 84 of the apparatus 12. The first working head 66 includes: a horizontal plate 86 which extends from the first movable member 80 in the horizontal direction away from the operator of the apparatus 12; a rotary plate 88 supported by and disposed below the horizontal plate 86, such that the rotary plate 88 is rotatable about a vertical axis C aligned with the rotating axis B of the side gears 32U, 32D (axle holes 40U, 40D) of the case 10 placed in the first assembling position; a geared motor 94 fixed to the horizontal plate 86, and having an output gear 92 meshing with a rotating gear 90 which is fixed to the rotary plate 88 so that the rotary plate 88 is rotated with the gear 90 about the axis C; a pair of swing plates 96L and 96R supported by the rotary plate 88, rotatably about respective axes D; a pair of swing gears 98L and 98R also supported by the rotary plate 88, rotatably about the respective axes D, and fixed to the swing plates 96L, 96R so that the swing plates 96L, 96R are swung or pivoted by the swing gears 98L, 98R; a swing cylinder 102 disposed on the rotary plate 88 to operate a rack 100 which meshes with the swing gears 98L, 98R; a pair of pinion support devices 104L and 104R supported by and disposed below the respective swing plates 96L, 96R; and a pair of pinion pushing devices 106L and 106R also supported by and disposed below the respective swing plates 96L, 96R, and located adjacent the respective pinion support devices 104L, 104R.

The pinion pushing devices 106L, 106R include respective cylinders 110L and 110R attached to respective brackets 108L and 10R which extend downward from the end of the respective swing plates 96L, 96R. The pinion pushing devices 106L, 106R further include respective pinion pushing heads 111L and 111R connected to the respective cylinders 110L, 110R. The pushing heads 111L, 111R are adapted to be advanced into the chamber 38 of the differential case 10, as described below, and have respective cylindrical operating portions 112L and 112R, and respective collars 113L and 113R (FIG. 9) formed behind the operating portions 112L, 112R. The operating portions 112L, 112R are adapted to contact the teeth of the respective pinions 36L, 36R (FIG. 20), while the collars 113L, 113R have substantially the same radii of curvature as the part-spherical washers 60L, 60R held in close contact with the part-spherical outer end faces of the pinions 36L, 36R. The collars 113L, 113R have a thickness not larger than that of the part-spherical washers 60L, 60R. The pinion pushing heads 111L, 111R function to push and move the pinions 36L, 36R within the differential case 10, along the circumference of the case 10 about the axis B, as explained below in detail by reference to FIGS. 20 and 21.

Figure 8:
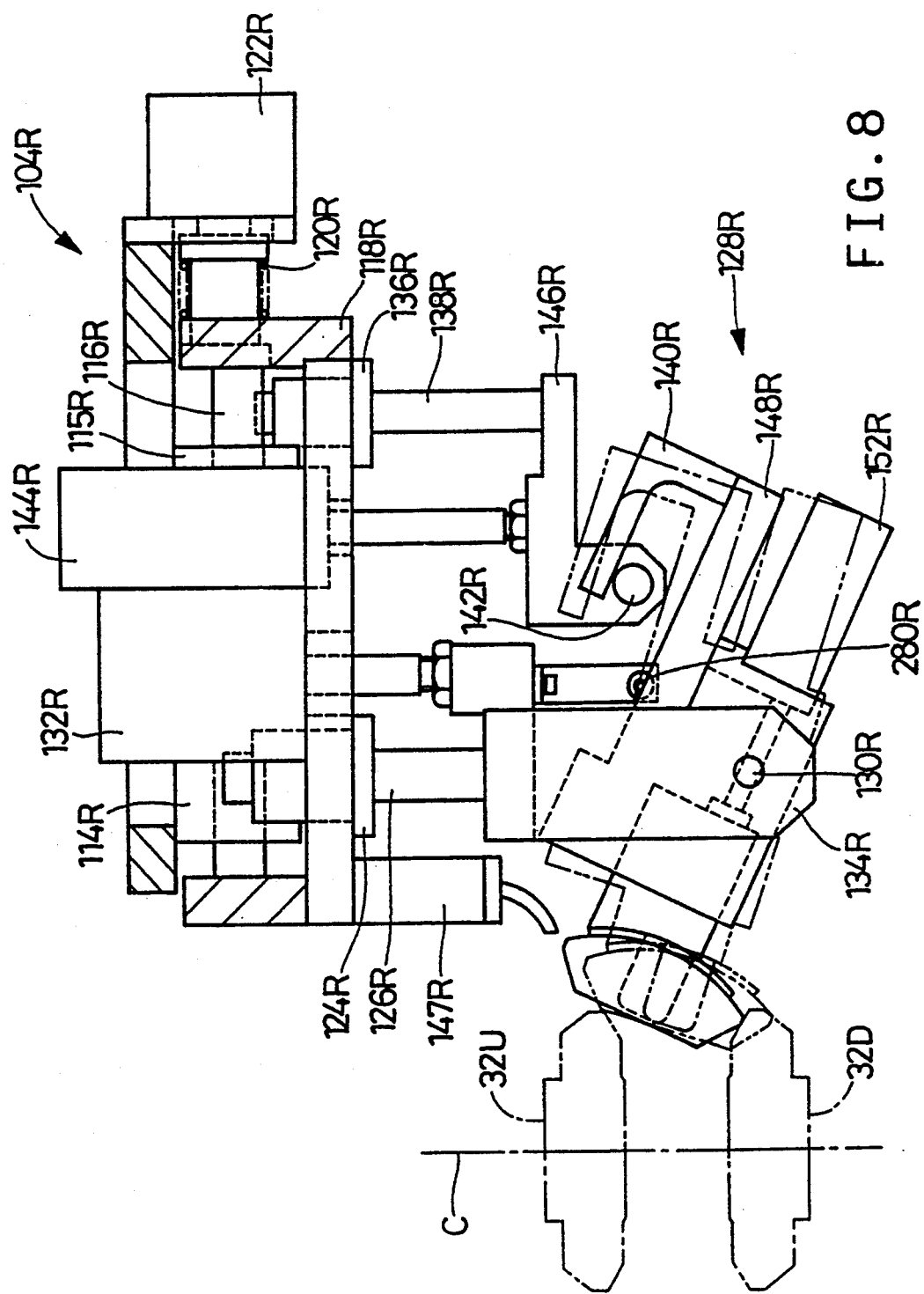
FIG. 8 is a view showing details of a right-hand side of one of a pair of right and left pinion support devices used in the first working head of FIG. 6.
Figure 9:
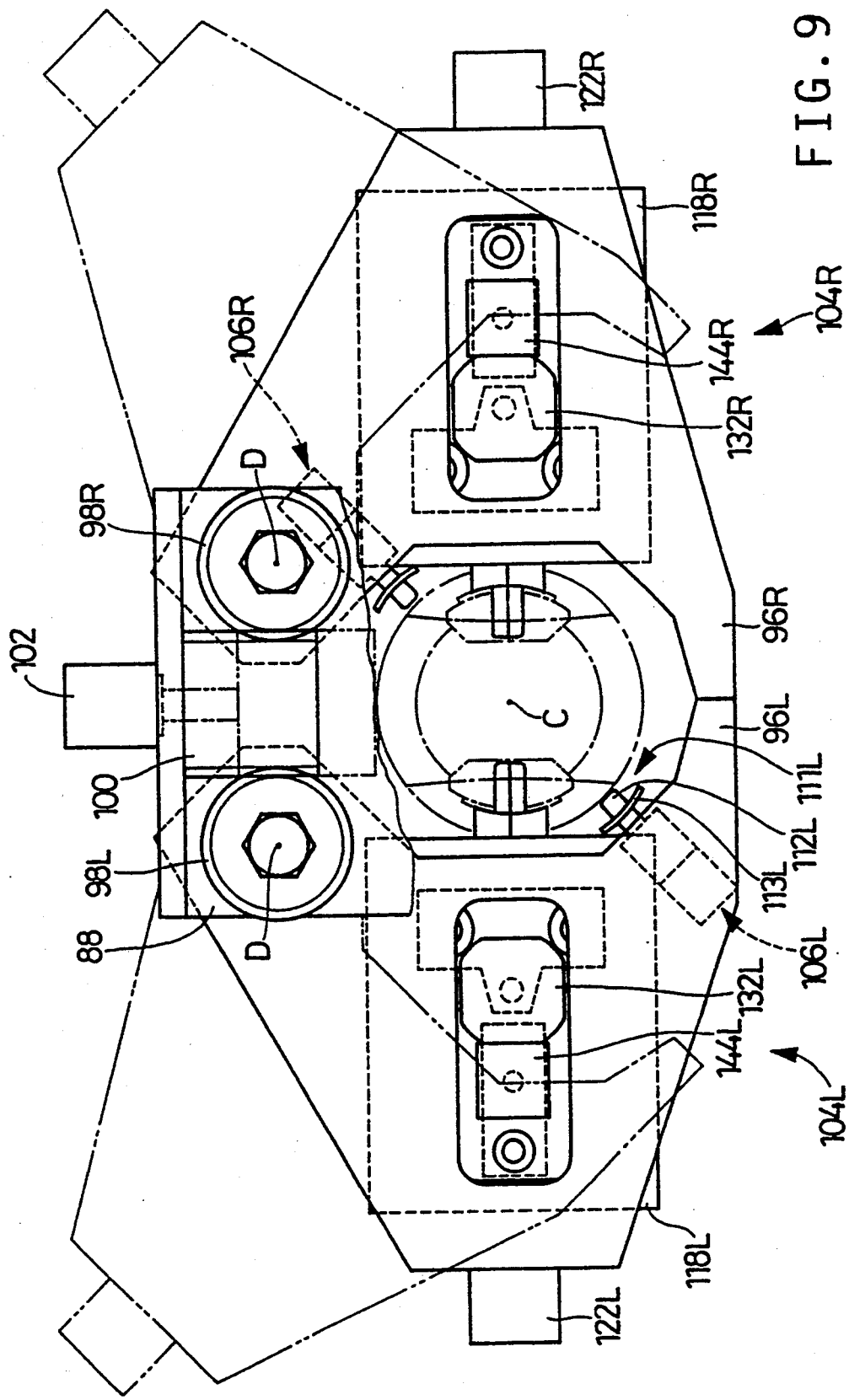
FIG. 9 is a plan view of the right and left pinion support devices, as seen from above a pair of swing plates of the pinion support devices.

As shown in detail in FIGS. 8 and 9, the pinion support devices 104L, 104R include: support blocks 114L, 115L, 114R, 115R attached to the underside of the respective swing plates 98L, 96R; a pair of yieldable members 118L and 118R which have respective pairs of guide rods 116L, 116R supported by the support blocks 114L, 115L, 114R, 115R, and which are movable relative to the swing plates 98L, 98R and the support blocks 114L, 115L, 114R, 115R, in a direction perpendicular to the vertical axis C; a pair of cylinders 122L and 122R for moving the respective yieldable members 118L, 118R via respective springs 120L and 120R; two pairs of vertical brackets 134L, 134R having respective first vertical rods 126L, 126R which slidably engage respective first guide bushings 124L, 124R fixed to the yieldable members 11SL, 118R; a pair of pivoting units 128L and 128R pivotally supported by the respective pairs of vertical brackets 134L, 134R through respective horizontal pins 130L, 130R such that the pivoting units 128L, 128R are pivotable about the pins 130L, 130R; a pair of cylinders 132L and 132R for vertically moving the respective vertical brackets 134L, 134R; a pair of inclination control members 146L and 146R for controlling the angle of inclination of the pivoting units 128L, 128R; a pair of cylinders 144L and 144R for vertically moving the respective inclination control members 146L, 146R; and a pair of lubricant dispensers 147L, 147R, for supplying a lubricant to the interfaces between the differential pinions 36L, 36R and the part-spherical washers 60L, 60R. The inclination control members 146L, 146R have respective second vertical rods 138L, 138R slidably engaging respective second guide bushings 136L, 136R fixed to the yieldable members 118L, 118R. The control members 146L, 146R also have engaging pins 142L, 142R which engage respective L-shaped engaging portions 140L, 140R formed at one end of the pivoting units 128L, 128R.

Figure 10:
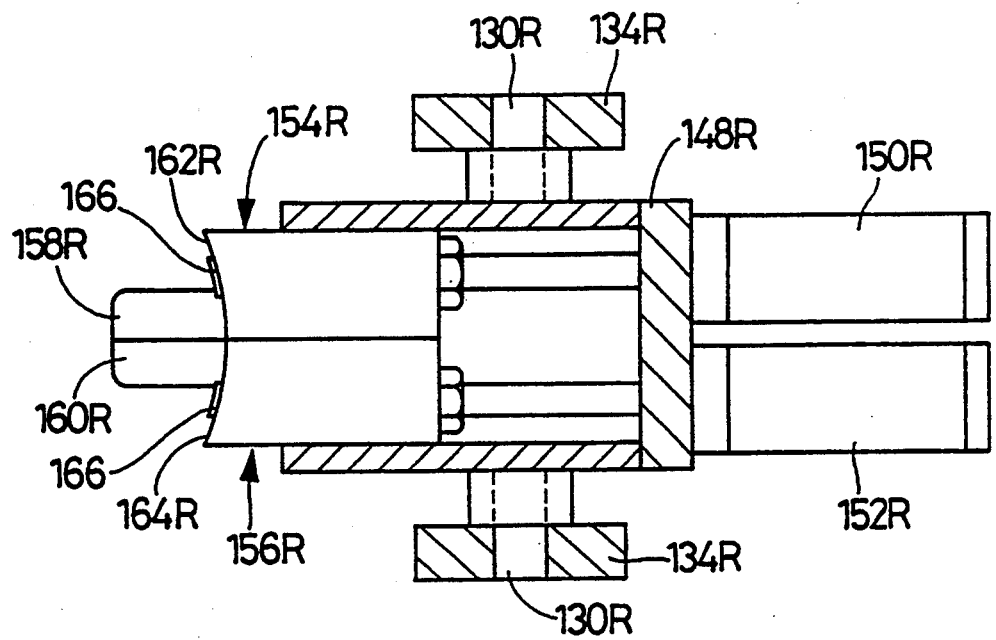
FIG. 10 is a plan view illustrating details of a pinion holding device of the right-hand side pinion support device of FIG. 8, which includes pinion holders and actuating cylinders.
Figure 11:
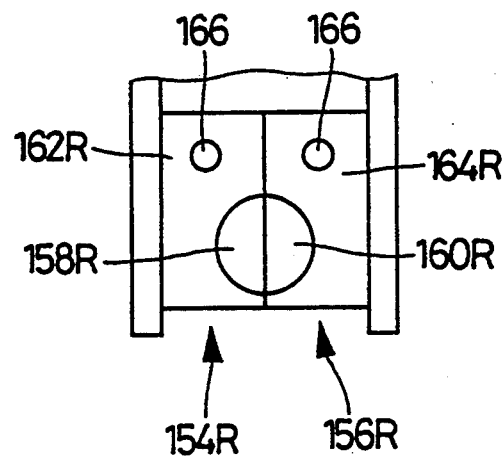
FIG. 11 is an end elevational view of the pinion holding device of FIG. 10.

Referring next to FIGS. 10 and 11 showing in detail the right-hand side pivoting unit 128L, by way of example, each of the right-hand side and left-hand side pivoting units 128L and 128R includes: a body 148L, 148R having the L-shaped engaging portion 148L, 148R; and a pair of parallel cylinders 150L and 152L, 150R and 152R attached to the body 148L, 148R; a pair of pinion holders 154L and 156L, 154R and 156R moved by the cylinders 150L and 152L, 150R and 152R, independently of each other. Each pinion holders 154L, 156L, 154R, 156R has a semi-cylindrical pin 158L, 160L, 158R, 160R, and a part-spherical surface 162L, 164L, 162R, 164R. The semi-cylindrical pins 158L and 160L cooperate with each other to form a cylindrical pin engageable with the bore of the differential pinion 35L, while the semi-cylindrical pins 158R and 160R cooperate with each other to form a cylindrical pin engageable with the bore of the differential pinion 35R. The part-spherical surfaces 162L, 164L, and 162R, 164R are formed for abutting contact with the outer surfaces of the part-spherical washers 60L, 60R in contact with the outer end faces of the pinions 36L, 36R. Each part-spherical surface 162L, 164L, 162R, 164R has a boss 166 engageable with a corresponding one of holes (not shown) formed through the washer 60L, 60R by piercing. These holes are spaced from the center hole of the washer 60L, 60R, by the same distance as seen in the plane of FIG. 3. The bosses 166 function to prevent rotation of the washer 60L, 60R with the pinion 36L, 36R when the pinion is rotated on the cylindrical pin 158L, 160L, 158R, 160R of the pinion holders 154L, 156L, 154R, 156R. The height of the bosses 166 from the surface 162L, 164L, 162R, 164R is equal to or smaller than the thickness of the washer 60L, 60R.

Figure 12:
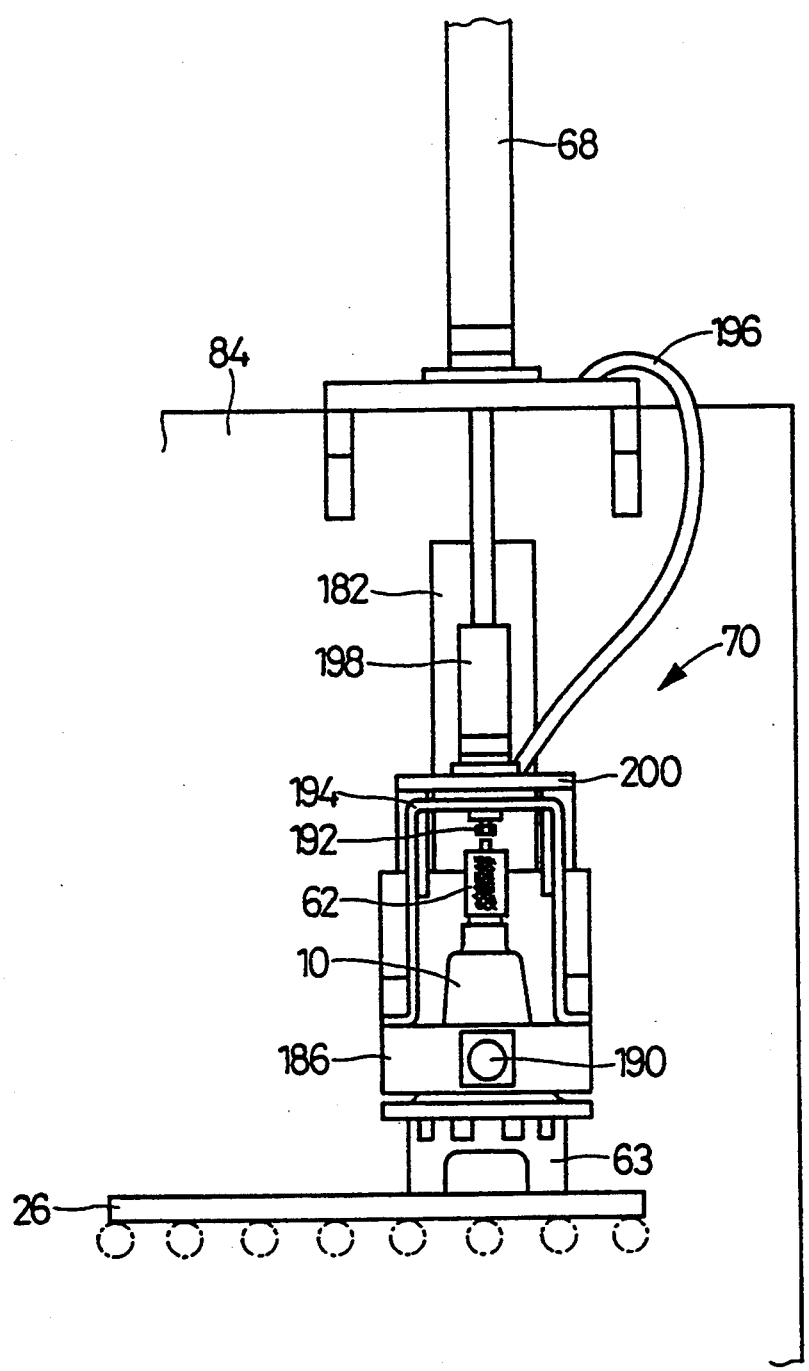
FIG. 12 is an enlarged front elevational view showing a second working head of the apparatus of FIG. 1.
Figure 13:
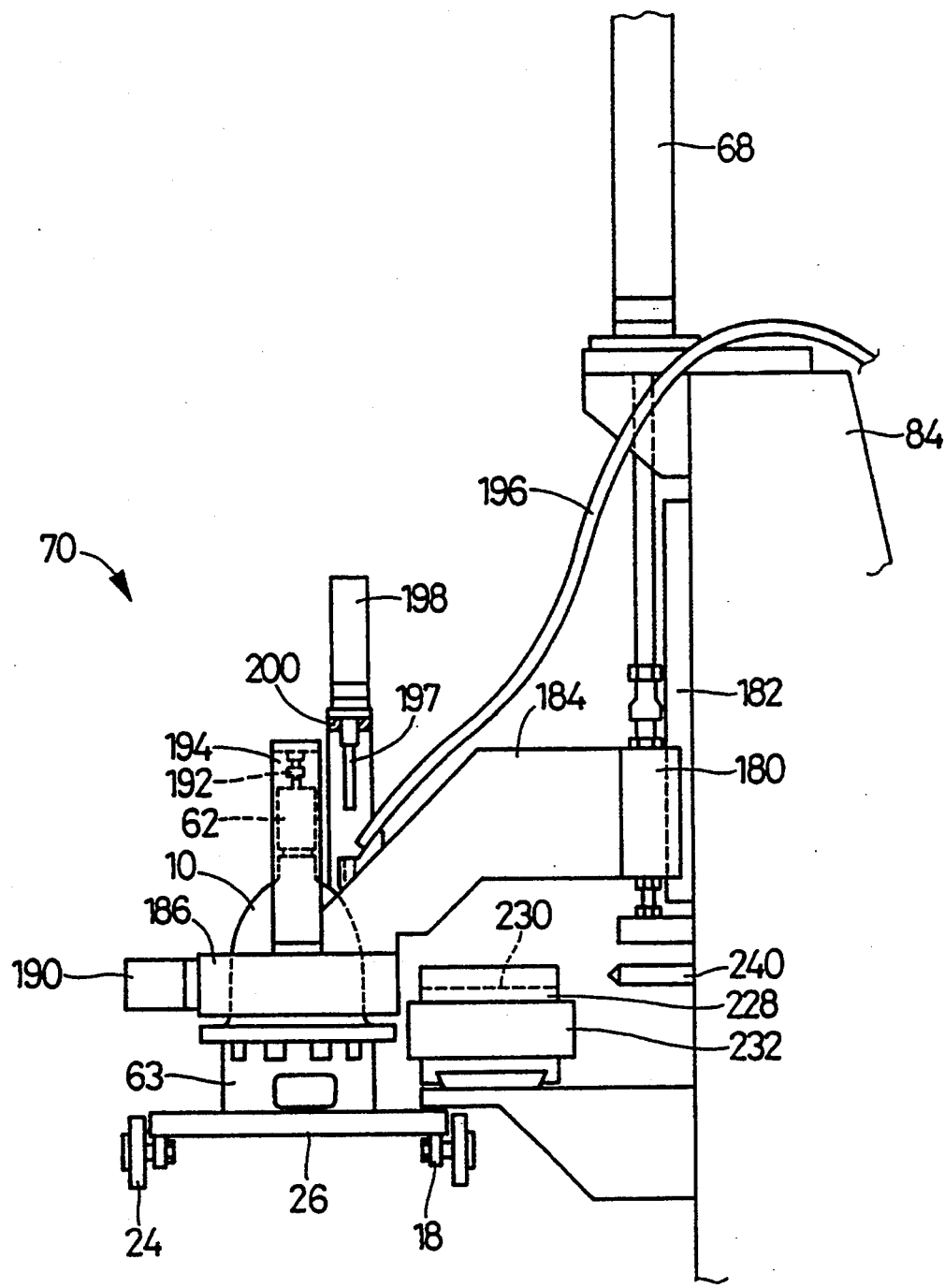
FIG. 13 is a side elevational view of the second working head of FIG. 12.
Figure 14:
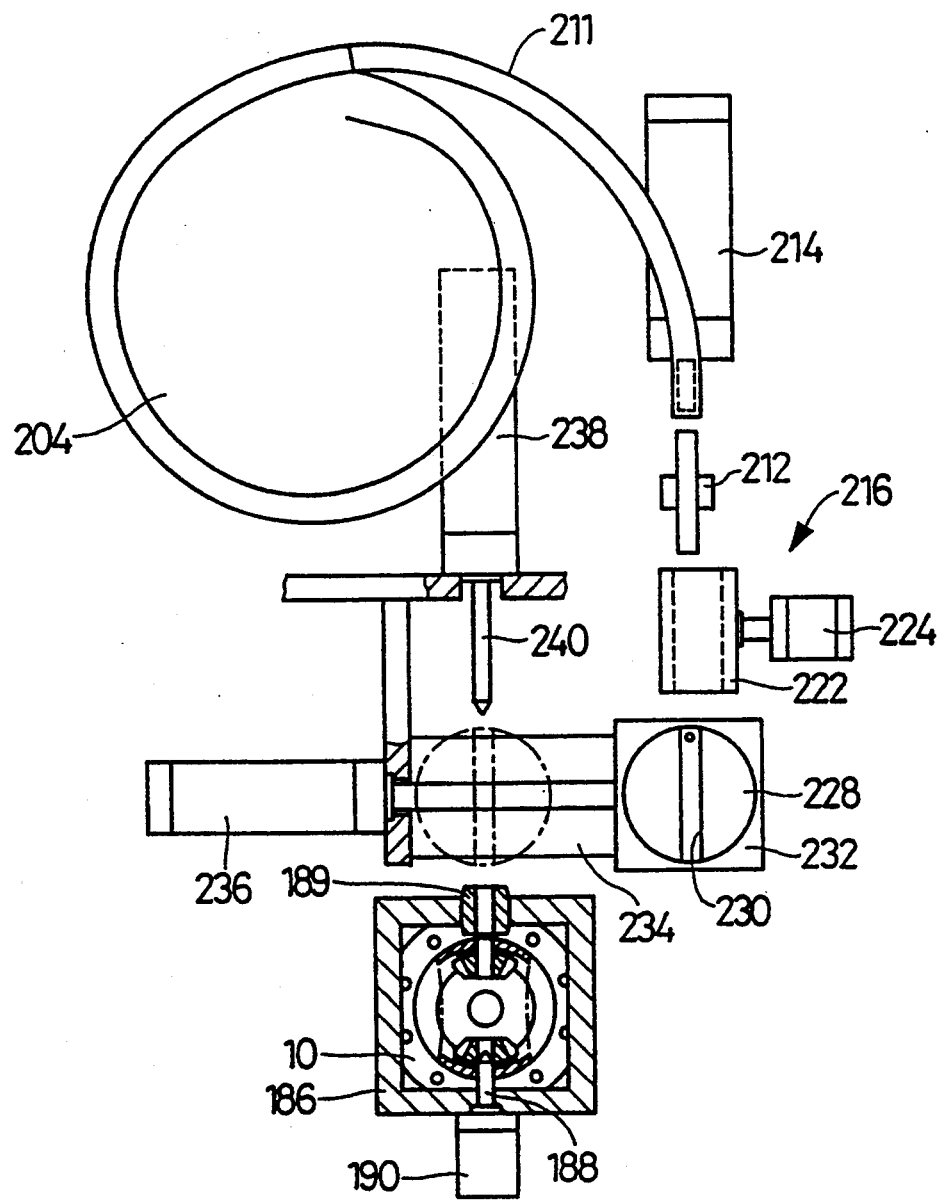
FIG. 14 is a plan view showing devices disposed below the second working head of the apparatus of FIG. 1.

As shown in detail in FIGS. 12, 13 and 14, the second vertical cylinder 68 is connected to a second movable member 180, which is vertically guided by a second guide rail 182 secured to the frame 84 of the apparatus 12. The second working head 70 is fixed to the free end of a bracket 184 which extends from the second movable member 180 in the direction toward the operator of the apparatus 12. The second working head 70 includes: a rectangular frame 186 adapted to surround the differential case 10 on the pallet 26 placed in the second assembling position; a guide bushing 189 which extends through one of the four walls of the frame 186 on the side remote from the operator and which guides a positioning/pushing rod 240; a positioning cylinder 190 which is attached to the wall of the frame 186 on the side of the operator and which is activated to advance a positioning rod 188 with a pointed end, into the shaft hole 42L, 42R of the differential case 10; a pressure member 192 for pushing the gear holding jig 62 partially inserted in the upper axle hole 40U of the case 10; a first portal frame member 194 which is fixed to the rectangular frame 186 and which supports the pressure member 192; a punching cylinder 198 which is activated to advance a punch 197 for driving the lock pin 44 supplied through a supply tube 196, into the pin hole 46; and a second portal frame 200 for supporting the punching cylinder 198.

As shown in FIG. 2, a lock pin feeder 202 for feeding the lock pin 44, and a shaft feeder 204 for feeding the pinion shaft 34 are provided in the rear portion of the frame 84 remote from the operator's side. The lock pin feeder 202 delivers successive pieces of the lock pin 44 to a feeding gate 210, which is operated in response to a timing signal received from an electronic control device 208, to feed under pressure one piece of the lock pin 44 at a time to the second working head 70 through the supply tube 196, at an appropriate timing according to the timing signal. As also shown in FIG. 14, successive pieces of the pinion shaft 34 delivered from the shaft feeder 204 to a shaft holder 212 are introduced into a posturing device 216 one piece at a time by a pusher cylinder 214. As described below, the posturing device 216 is adapted to establish a predetermined angular position of the pinion shaft 34 about its axis.

Figure 15:
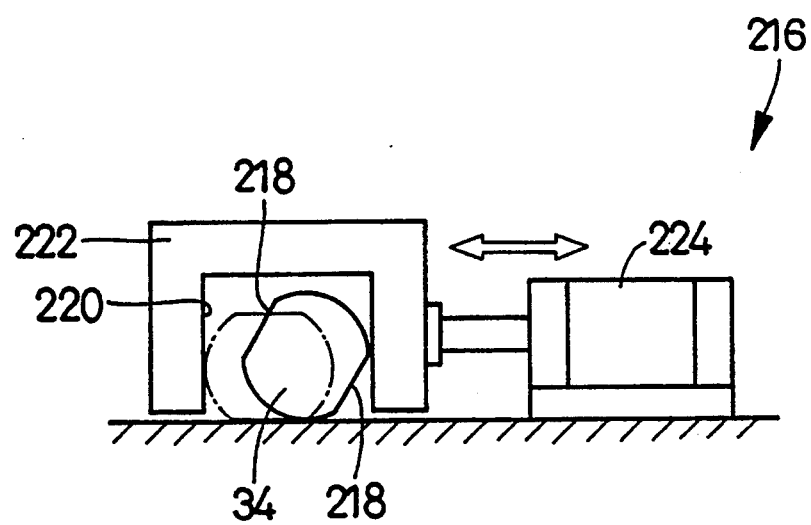
FIG. 15 is a view illustrating details of a shaft posturing device shown FIG. in 14.

The pinion shaft 34 has two opposed parallel flat faces 218 continuous with two opposed arcuate surfaces, as seen in the transverse cross sectional view of FIG. 15. The posturing device 216 includes an inverted U-shaped channel member 222 having a U-shaped groove 220 which is open downward and which extends in the direction parallel to the longitudinal direction of the shaft 34 as received from the shaft holder 212. The device 216 also includes a reciprocating cylinder 224 for reciprocating the channel member 222 in the direction perpendicular to the direction of extension of the U-shaped groove 220. With the channel member 222 being reciprocated, the pinion shaft 34 received in the U-shaped groove 220 is postured about its axis so that the two flat faces 218 are parallel to the horizontal plane, as indicated by one-dot chain line in FIG. 15.

Upon completion of the posturing of the pinion shaft 34 in the posturing device 216, the pusher cylinder 214 is activated to push out the next pinion shaft 34 from the shaft holder 212 into the posturing device 216, whereby the postured shaft 34 is pushed out from the posturing device 216 into a groove 230 formed in a turn table 228 disposed adjacent the posturing device 216. The turn table 228 is rotatable about a vertical axis by an indexing device 232, between two angular positions (0° and 180°) having an angular phase difference of 180°. The function of the indexing of the turn table 228 will be described below. The turn table 228 has two linear positions in the direction parallel to the direction of movement of the pallet 26. Namely, the turn table 228 is movable on a guide rail 234 by a positioning cylinder 236 between a shaft-receiving position in which the groove 230 is in line with the rod of the pusher cylinder 214 (and the U-shaped groove 220 of the posturing device 216), and a shaft-feeding position in which the groove 230 is in line with the shaft holes 42L, 42R of the differential case 10 in the second assembling position as shown in FIG. 14.

When the turn table 228 is located in the shaft-feeding position, the pinion shaft 34 in the groove 230 is inserted into the differential case 10 in the second assembling position, by the positioning/pushing rod 240 upon activation of a positioning/pushing cylinder 238. More particularly, the pinion shaft 34 is inserted through the guide bushing 189 of the rectangular frame 186 of the second working head 70, the shaft holes 42L, 42R, washers 60L, 60R and pinions 36L, 36R. The positioning/pushing rod 238 has a pointed end, and is advanced also before the insertion of the pinion shaft 34, for positioning the pinion 36L or 36R and the corresponding washer 60L, 60R with respect to the corresponding shaft hole 42L or 42R. In this case, the rod 238 itself, rather than the pinion shaft 34, is inserted through the shaft hole 42L, 42R, washer 60L, 60R and pinion 36L, 36R.

As described above, the pinion shaft 34 has the pin hole 47 at one of its opposite end portions. For alignment of the pin hole 47 with the pin hole 46 of the differential case 10 when the pinion shaft 34 is inserted into the case 10, the pinion shaft 34 should be positioned in the groove 230 of the turn table 228 such that the pin hole 47 is located at the end of the groove 230 remote from the operator of the apparatus 12, so that the lock pin 44 is inserted in the pin holes 46, 47 on the side of the case 10 remote from the operator. To this end, the apparatus 12 is provided with a suitable sensor (not shown) for detecting the pin hole 47 at the end of the pinion shaft 34 on the side remote from the operator. If the sensor does not detect the pin hole 47, a signal is applied from the sensor to the electronic control device 208, which activates the indexing device 232 to turn the turn table 232 through 180°, when the turn table 228 is located in its shaft-feeding position.

Figure 16:
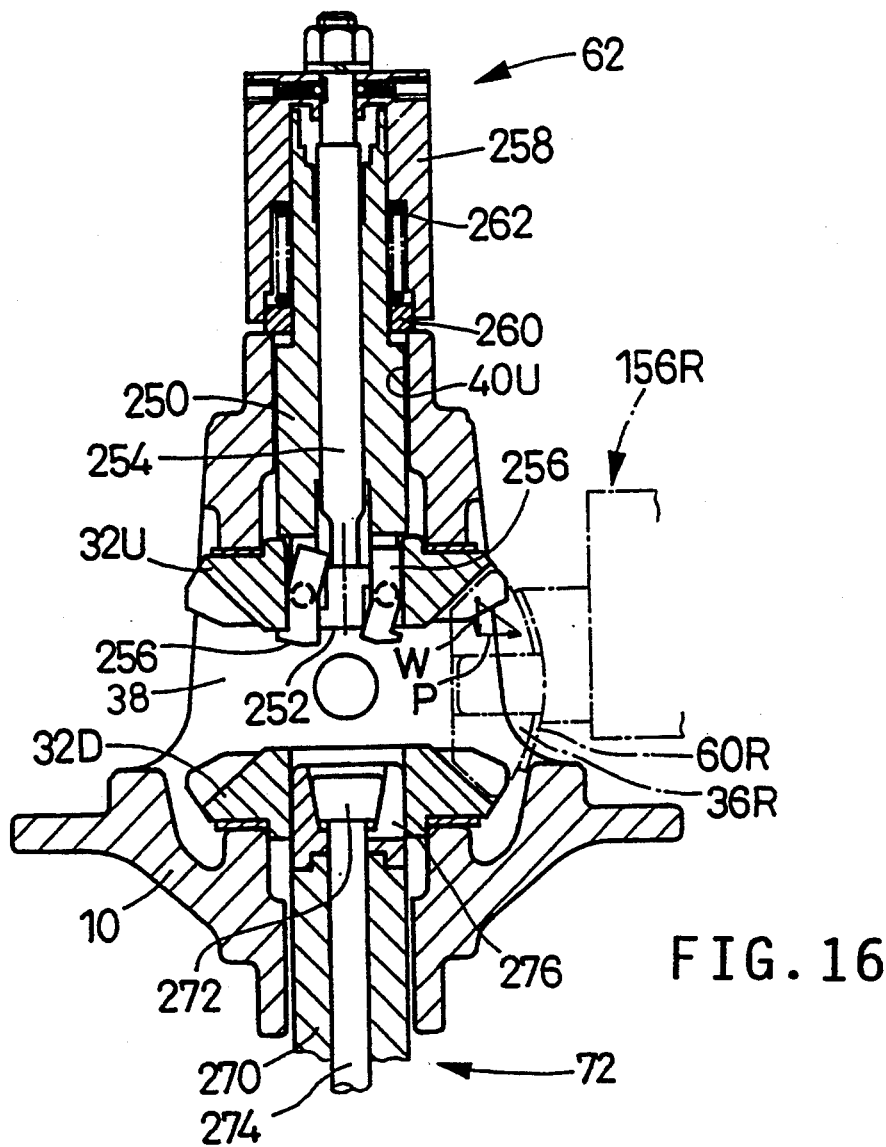
FIG. 16 is a front elevational view in longitudinal cross section of the differential case located at a first assembling position on the automatic assembling apparatus of FIG. 1.
Figure 17:
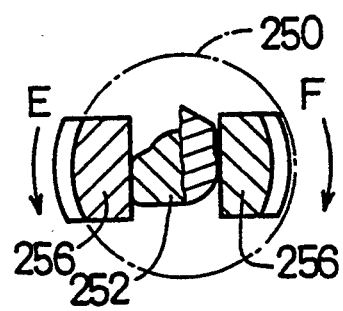
FIG. 17 is a fragmentary cross sectional view indicating a relationship between a cam portion and gear holding jaws of a gear holding jig shown in FIG. 16.

Referring to FIG. 16, there is shown the differential case 10 prior to the automatic assembling on the present assembling apparatus 12. For preparation for the automatic assembling, the pair of differential side gears 32U and 32D are held at the predetermined positions within the chamber 38 of the case 10 placed on the pallet 26. The upper side gear 32U and the corresponding disk washer 58U are held by the gear holding jig 62 which is partially inserted through the upper axle hole 50U. The gear holding jig 62 includes: a cylindrical body 250 with a stepped outer circumferential surface, which has a proximal portion whose outside diameter is smaller than an intermediate portion; a rotary cam shaft 254 which extends through a longitudinal center bore of the cylindrical body 250 and which has a cam portion 252 at its distal or lower end as shown in FIG. 17; a pair of gear-holding jaws 256 attached to a distal end portion of the body 250 such that the jaws 256 are pivotable; an operating sleeve 258 which is fixed to the proximal end of the rotary cam shaft 254 and which covers the proximal portion of the body 250; a ring member 260 mounted on the proximal portion of the body 250, near the shoulder between the proximal and intermediate portions of the body 250; and a coil spring 262 interposed between the ring member 260 and the operating sleeve 258. The gear-holding jaws 256 are pivoted by the cam portion 252, between a gear-holding position for holding the side gear 32U, and a non-holding position for releasing the side gear 32U. With the jaws 256 placed in the gear-holding position, the ring member 260 is held in abutting contact with the upper end face of the case 10 in which the axle hole 40U is open, so that a thrust force due to the biasing force of the spring 262 acts on the body 250 in the upward direction. In FIGS. 16 and 17, the cam portion 252 is shown as placed in a gear-holding position as indicated on the left-hand side of the center line of the shaft 254, and as placed in a non-holding position as indicated on the right-hand side of the center line. Since the cam portion 252 is configured or shaped as indicated in FIG. 17, once the pair of jaws 256 have been placed in the gear-holding position by a given amount of rotation of the rotary cam shaft 254 relative to the body 250, a further relative rotation of the cam shaft 254 and the body 250 is prevented.

To set the gear holding jig 62 on the differential case 10, the lower part of the jig 62 is first inserted into the axle hole 40U against the biasing force of the spring 262, and then the operating sleeve 258 is rotated with the rotary cam shaft 254. When the differential case 10 is transferred to the second assembling position, the jig 62 is pushed down by the pressure member 192 of the second working head 70, to force the upper side gear 32U toward the lower side gear 32D, for the purpose which will be understood. To this end, the outside diameter of the intermediate portion of the body 250 is larger than that of the distal end portion to be inserted through the bore of the side gear 32U, so that the shoulder surface between the intermediate and distal end portions of the body 250 will abut on the upper end of the side gear 32U when the jig 62 is pushed down. The cam portion 252 is shaped so as to inhibit rotation of the body 150 (and the jaws 256) relative to the cam shaft 254 (and the cam portion 252) in the direction E as indicated in FIG. 17 even when the side gear 32U is rotated in the direction E during the assembling procedure as explained below, but permit rotation of the body 150 relative to the shaft 254 in the direction F as indicated in FIG. 17 when the side gear 32U is rotated in the direction F, whereby the side gear 32U may be released from the jaws 256, that is, the jaws 256 may be brought to the non-holding position.

FIG. 16 also shows the end portion of the chucking device 72 as placed in the position for chucking and rotating the lower side gear 32D. This chucking device 72 includes: a cylindrical body 270 to be inserted into the lower axle hole 40D by the elevating cylinder 78 indicated above; a shaft 274 which extends through the longitudinal center bore of the body 270 and which has an inverted frusto-conical cam 272 at its upper end; and a collet chuck 276 which is disposed adjacent the upper end of the body 270 and which is expanded by the cam 272 upon downward movement of the shaft 274 by a suitable cylinder, to thereby hold the side gear 32D at its inner surface. The collet 276 consists of three separate sections, for example, which are arranged in the circumferential direction of the side gear 32D.

There will next be described the automatic assembling operations of the apparatus 12 under the control of the electronic control device 208.

As described above, the upper side gear 32U is held in place by the jig 62 in the upper portion of the chamber 38 of the differential case 10, while the lower side gear 32D is positioned in the lower portion of the chamber 38, in alignment with the lower axle hole 40D. The case 10 with the side gears 32U, 32D thus held therein is placed on the pallet 26 through the cylindrical FIG. 63. The pallet 26 is transferred from the loading conveyor 20 onto the carriage 24. The automatic assembling procedure is started with the detection of the pallet 26 on the carriage 14 by a suitable sensor (not shown). Upon detection of the pallet 26, the pallet 26 is positioned by the pallet stop 28, so that the differential case 10 is brought to the first assembling position. With case 10 placed in the first assembling position, the chucking device 72 is elevated with the collet 276 inserted in the center bore of the lower side gear 32D, and the collet 276 is then expanded to chuck the side gear 32D. Then, the chucking device 72 is lowered by a small distance to force the side gear 32D against the lower surface of the chamber 38, as indicated in FIG. 16.

In the meantime, the differential pinions 36L, 36R and the part-spherical washers 60L, 60R are mounted on the pinion holders 154L, 156L, 154R, 156R of the first working head 66. Upon completion of the operation of the chucking device 74 described above, the first working head 66 is lowered to a predetermined intermediate operating position by the first vertical cylinder 64. In this intermediate operating position, the swing cylinder 102 is activated to swing the swing plates 96L, 96R from the open position indicated by two-dot chain line in FIG. 9, to the closed position indicted by solid line. Then, the parallel cylinders 150L, 152L, 150R, 152R are activated to advance the pinion holders 154, 156 with the differential pinions 36L, 36R, and then the first working head 66 is lowered to a predetermined lower operating position. As a result, the pinions 36L, 36R are inserted into the chamber 38 of the case 10 through the respective openings 48F, 48B, without an interference with the outer wall surface of the case 10, and are brought into contact with the teethed portion of the lower side gear 32D, under a small contact force due to the weight of the pinions 36L, 36R.

The pivoting units 128L, 128R having the pinion holders 154, 156 and pivotally supported by the vertical brackets 134L, 134R via the horizontal pins 130L, 130R are constructed such that the gravity center of the units 128L, 128R with the pinions 36L, 36R mounted thereon lies on one of opposite sides of the pin 130L, 130R which is remote from the cylinders 150L, 150R. However, as the first working head 66 is lowered after the abutting contact of the pinions 36L, 6R with the side gear 32D, the pivoting units 128L, 128R is slightly pivoted in the clockwise direction as seen in FIG. 8, until the L-shaped engaging portion 140L, 140R is lowered down to a position just above a point of contact with the engaging pin 142L, 142R, as indicated by solid line in FIG. 8. In the present embodiment, the vertical brackets 134L, 134R and the pivoting units 128L, 128R which are supported by the brackets 134 via the horizontal pins 130L, 130R such that the gravity center of the units 128 lies on the side of the pinions 36 mounted thereon cooperate to function as a pinion pressing device for forcing the pinions 36L, 36R onto 10 the lower side gear 32D, with the pinions 36L, 36R being spaced apart from the upper side gear 32U.

The motor 76 is turned on to rotate the chucking device 72 in a predetermined direction, at the time of initiation of the lowering movement of the first working head 66 or at an appropriate time thereafter. Accordingly, the pair of differential pinions 36L, 36R are brought into meshing engagement with the lower side gear 32D, with a result of a slight downward movement of the pinions 36L, 36R due to their tooth engagement with the teeth of the side gear 32D, whereby the pivoting units 128L, 128R are accordingly pivoted in the counterclockwise direction as seen in FIG. 8, as indicated by two-dot chain line in FIG. 8. This pivoting movements of the units 128L, 128R are detected by position sensors 280L, 280R which are moved with the vertical brackets 134L, 134R. While the pinions 36L, 36R are rotated with the side gear 32D, a lubricant oil is delivered from the dispensers 147L, 147R, to the contacting surfaces of the pinions 36L, 36R and the part-spherical washers 60L, 60R. With the pinions 36L, 36R rotated relative to the washers 60L, 60R held stationary by the bosses 166 on the pinion holders 154, 156, the contacting surfaces of the pinions 36 and washers 60 are entirely coated with the lubricant oil, whereby the adhesion force between the pinions 36 and washers 60 is increased by the lubricant oil, in order to prevent the washers 60 from being separate from the pinions 36 when these members 36, 60 are subsequently released from the pinion holders 154, 156.

When the counterclockwise pivoting of the pivoting units 128L, 128R, that is, the meshing engagement of the pinions 36L, 36R and the side gear 32D is detected by the position sensors 280L, 280R, the motor 72 is reversed to rotate the chucking device 72 in the reverse direction, while at the same time the cylinders 144L, 144R are activated to elevate the inclination control members 146L, 146R to bring the pivoting units 128L, 128R to a substantially horizontal posture. Simultaneously, the cylinders 122L, 122R are activated to move the yieldable members 118L, 118R via the springs 120L, 120R toward the vertical axis C of the side gears 32D, 32U. As a result, the pinions 36L, 36R are forced also onto the upper side gear 32U. During the upward movement of the inclination control members 146L, 146R, each cylinder 132L, 132R is held in the non-operating state in which the two chambers on the opposite sides of the piston have the same pressure, whereby a sliding resistance of a sealing O-ring of the piston of each cylinder 132L, 132R acts on the vertical bracket 134L, 134R in the upward and downward directions.

When the pinions 36L, 30R cannot be smoothly brought into meshing engagement with the side gear 32U, the pinions 36L, 36R are allowed to be displaced directions away from the gear 32U, with the yieldable members 118L, 118R being moved against the biasing action of the springs 120L, 120R. Thus, the yielding movements of the yieldable members 118 protect the pinions 36L, 36R and the side gear 32U against damage of their teeth. In the event of detection by suitable sensors of a failure of the yieldable members 118L, 118R to be advanced to a predetermined position in spite of the advancing activation of the cylinders 122L, 122R, or a failure of at least one of the vertical brackets 134L, 134R and the inclination control members 146L, 146R to be moved to a predetermined elevated position, the cylinders 122L, 122R are operated in the reverse direction to return the yieldable members 118L, 118R to the original position, and the cylinders 144L, 144R are operated in the reverse direction to return the pivoting units 128L, 128R to the original position. Then, the cylinders 122, 144 are activated in the forward or upward direction, to bring the pivoting units 128L, 128R to the substantially horizontal posture, to effect meshing engagement of the pinions 36L, 36R with the side gear 32U. The pinion gears 36L, 36R which have properly meshed with the side gears 32U, 32D are indicated by one-dot chain line in FIG. 16. Thus, the pinion support devices 104L, 104R also function as a gear meshing device for meshing the pinions 36L, 36R with the side gears 32U, 32D, in cooperation with the first vertical cylinder 64.

Since the meshing engagement of the pinions 36L, 36R with the upper side gear 32U is effected while the lower side gear 32D is rotated in the reverse direction by the chucking device 72 and the motor 72, the completion of the meshing engagement results in the rotation of the upper side gear 32U in the direction F (FIG. 17), whereby the body 250 of the jig 62 and the jaws 256 are rotated in the direction F relative to the rotary cam shaft 254, whereby the jaws 256 are brought to the non-holding position to release the upper side gear 32U. Consequently, an axial load W of the side gear 32U produces a radially outward thrust P on the pinions 36L, 36R, as indicated in FIG. 16, whereby the part-spherical washers 60L, 60R are forced by the pinions 36 against the part-spherical surfaces 59 of the case 10, whereby the downward displacement of the washers 60 relative to the pinions 36 is effectively avoided. In the present embodiment, the upper side gear 32U serves as a device for biasing the upper and lower side gears 32U, 32D toward each other.

Figure 18:
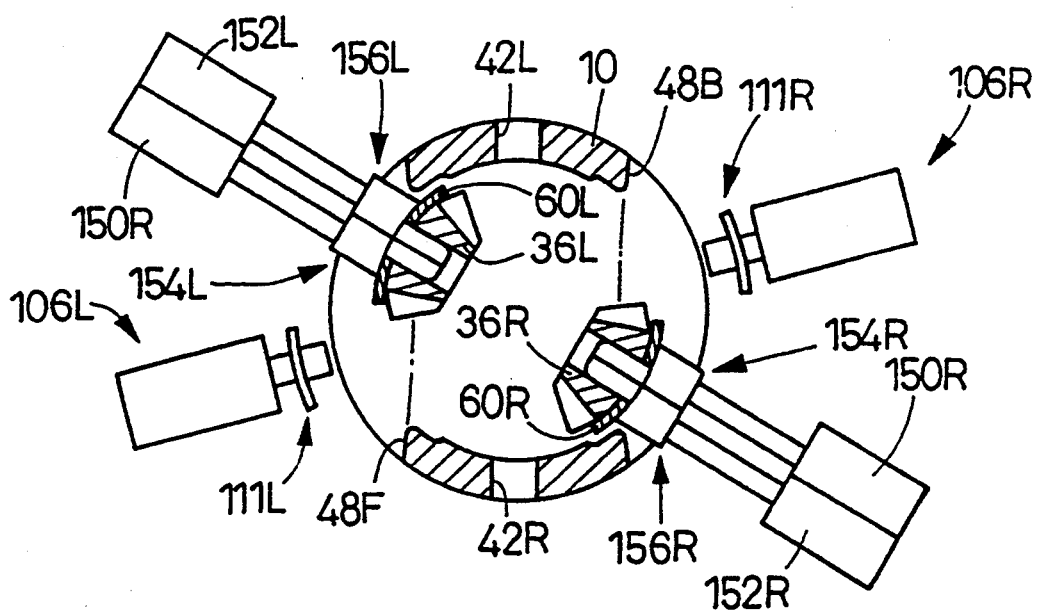
FIG. 18 is a plan view explaining an operation of the apparatus of FIG. 1, wherein the two pinions held by the respective pinion holding devices are moved within the differential case, along the circumference of the case, to a first angular position.

Upon detection by a sensor (not shown) of the meshing engagement of the pinions 36L, 36R with the side gears 32U, 32D in the manner as described above, the chucking device 72 is operated to the unchucking position for releasing the lower side gear 32D, and the geared motor 94 is turned on to rotate the pinion support devices 104L, 104R in the clockwise direction about the axis C (about the axis B), to a predetermined first angular position in which the pinion holders 156L, 156R cooperating with the pinion holders 154L, 154R to rotatably support the pinions 36L, 36R are located adjacent one of opposite circumferential ends of the openings 48F, 48B as indicated in FIG. 18. The clockwise direction indicated above is clockwise as seen in FIG. 18.

Figure 19:
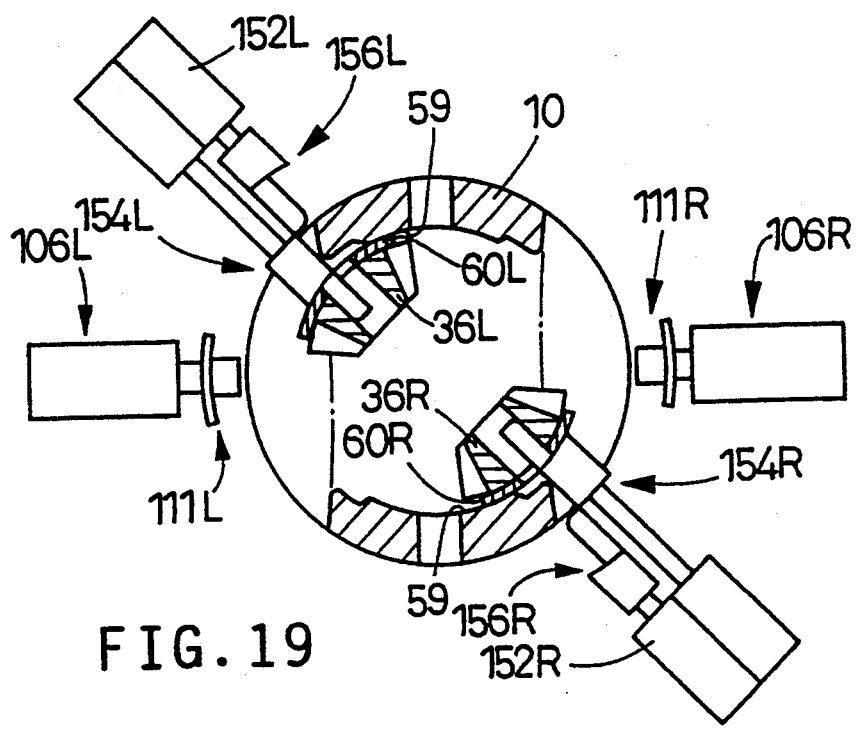
FIG. 19 is a plan view explaining another operation of the apparatus, wherein the pinions are moved by the pinion holding devices relative to the differential case from the first angular position of FIG. 18 to a second angular position.

Then, the pinion holders 156L, 156R (second pinion holder) on the leading side as seen in the clockwise rotating direction of FIG. 18 are retracted away from the pinions 36L, 36R by the corresponding cylinders 152L, 152R, with the pinions 36L, 36R left in the first angular position. Successively, the pinion support devices 104L, 104R are rotated in the clockwise direction about the axis C to a predetermined second angular position in which the still advanced pinion holders 154L, 154R (first pinion holder) are located adjacent the above-identified circumferential end of the openings 48F, 48B, as indicated in FIG. 19. In this condition, the pinions 36L, 36R are interposed between the side gears 32U, 32D and the part-spherical surfaces 59 of the case 10, whereby the downward displacement of the part-spherical washers 60L, 60R away from the pinions 36 is prevented. FIG. 19 shows the positions of the pinions 36 and pinion holders 154, 156 corresponding to the second angular position of the pinion support devices 104L, 104R.

Figure 20:
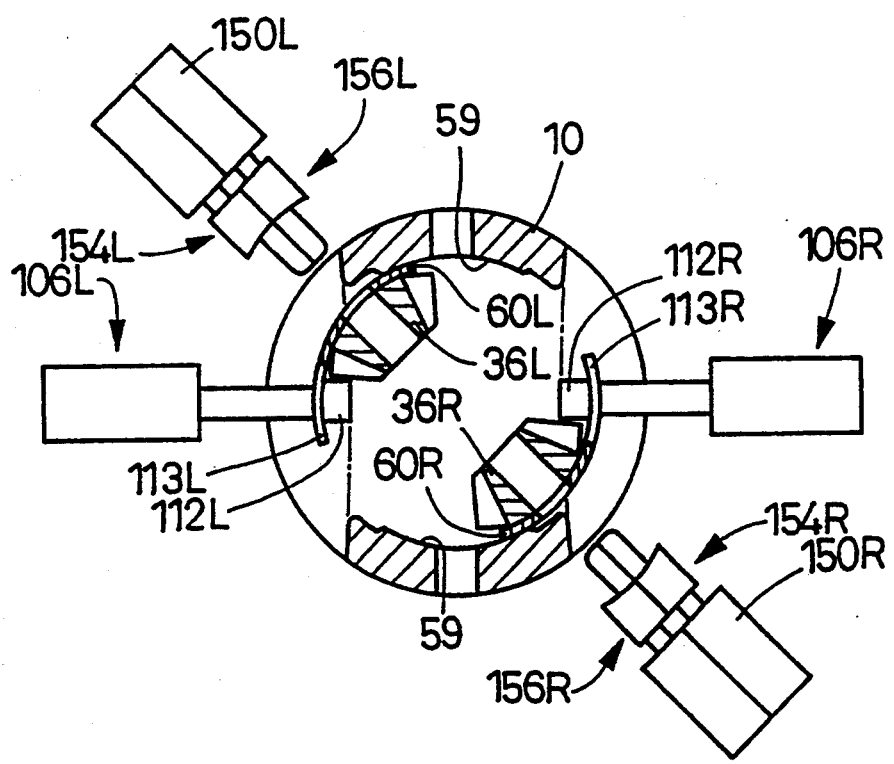
FIG. 20 is a plan view explaining a further operation of the apparatus, wherein the pinion holding devices release the pinions at the second angular position, and pinion pushing heads are advanced into the interior of the differential case.

Successively, the pinion holders 154L, 154R (first pinion holder) are also retracted by the corresponding cylinders 150L, 150R, with the pinions 36L, 36R left in the second angular position, and the pinion pushing heads 111L, 111R of the pinion pushing devices 106L, 106R are advanced for substantial abutting contact of the cylindrical operating portions 112L, 112R with the teeth of the pinions 36L, 36R, and for substantial abutting contact of the collars 113L, 113R with the rear end face of the pinions 36L, 36R and the edge of the part-spherical washers 60L, 60R, as indicated in FIG. 20. In the present embodiment, the parallel cylinders 150L, 150R, 152L, 152R function as a device for retracting the pinion holders 154L, 154R, 156L, 156R.

Figure 21:
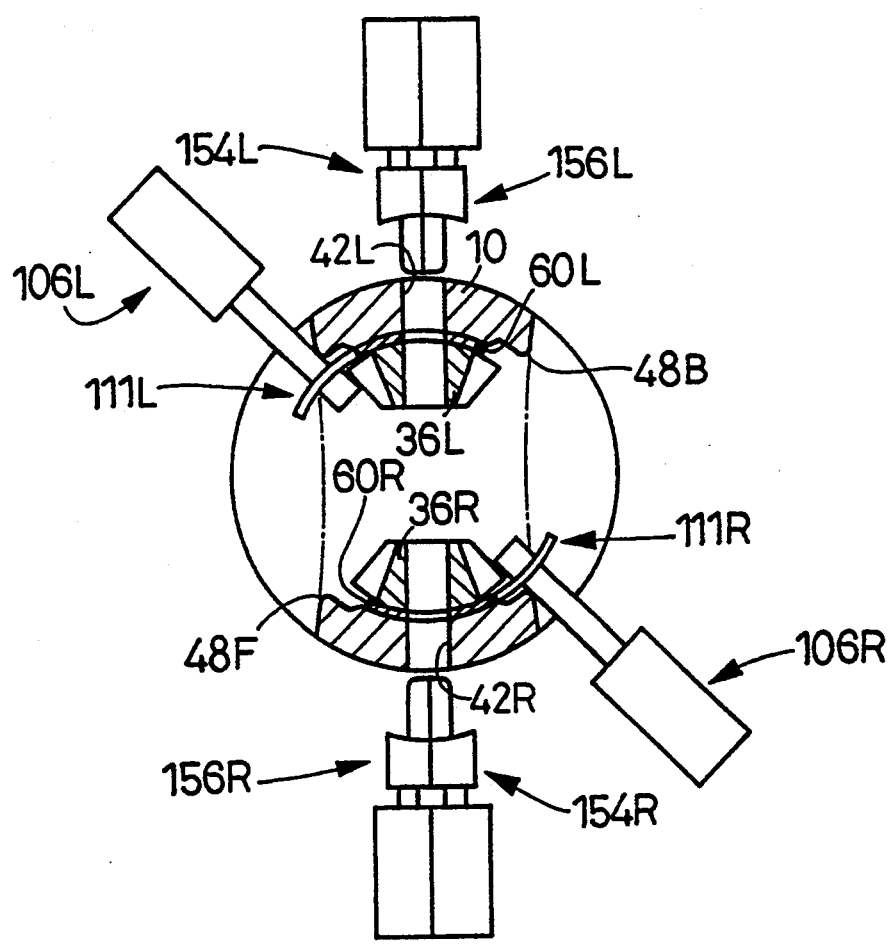
FIG. 21 is a plan view explaining a still further operation of the apparatus, wherein the pinions are moved by the pinion pushing heads, relative to the differential case, to a third angular position.

In the next step, the geared motor 94 is operated to rotate the pinion support devices 104L, 104R about the axis C to a predetermined third angular position, whereby the pinions 36L, 36R and the washers 60L, 60R adhering to the pinions 36 are moved into alignment with the shaft holes 40U, 40D, as indicated in FIG. 21, so that the pinion shaft 34 is subsequently inserted through the shaft holes 40, washers 60 and pinions 36, as described below.

It is to be understood that the motor 94 serves as a device for rotating the side gears 32U, 32D and pinions 36L, 36R about the axis B (axis C) relative to the case 10, until the pinions 36L, 36R are aligned with the shaft holes 42L, 42R.

Then, the chucking device 72 is again activated to chuck the lower side gear 32D, and the geared motor 94 is operated in the reverse direction to return the pinion support devices 104L, 104R to the second angular position of FIG. 20. The chucking device 72 is then operated to the unchucking position, and the cylinders 106L, 106R are activated to retract the pinion pushing heads 111L, 111R to the original position. The geared motor 94 is further operated in the reverse direction to return the pinion support devices 104L, 104R to the original position of FIG. 9. Subsequently, the cylinders 122L, 122R are activated to retract the pivoting units 128L, 128L in the direction away from the differential case 10, and the first vertical cylinder 64 is operated to elevate the first working head 66 to a predetermined intermediate position, in which the swing cylinders 102 are operated to swing the swing plates 96L, 96R to the open position. Further, the parallel cylinders 150L, 150L, 152L, 152R are activated to advance the pinion holders 154, 156, and the cylinders 132L, 132R, 144L, 144R are activated to lower the first brackets 134 and the inclination control members 146. Then, the first working head 66 is further raised to the original position. The swing plates 96L, 96R are swung to their open position after the head 66 is once elevated to the predetermined intermediate position, as described above, for the purpose of avoiding an interference of the head 66 with the differential case 10.

Upon completion of the assembling operations in the first assembling position, the reciprocating cylinder 16 is activated to move the carriage 14 so that the differential case 10 on the pallet 26 is placed in the second assembling position. When this movement of the carriage 14 is detected, the second vertical cylinder 68 is activated to lower the second working head 70 until the pressure member 192 abuts on the gear holding jig 62, as indicated in FIGS. 12 and 13. With the jig 62 pushed downward by the pressure member 192, the upper side gear 32U is forced down toward the lower side gear 32D, producing a force which includes a component acting on the pinions 36L, 36R in the axis direction of the pinions 36, whereby the pinions 36 are forced against the inner surfaces 59 of the differential case 10.

Thus, the pressure member 192 serves to assure improved protection of the part-spherical washers 60L, 60R against downward displacement on the outer end faces of the pinions 36L, 36R, or separation of the washers 60 from the pinions 36.

Then, the positioning/pushing cylinder 238 is activated to advance the positioning/pushing rod 240 into the bore of the pinion 36L through the guide bushing 189 of the frame 186, shaft hole 42L and washer 60L, while the positioning cylinder 190 is activated to advance the positioning rod 188 into the core of the pinion 36R through the shaft hole 42R and washer 60R. Thus, the pinion 36L and the corresponding washer 60L are accurately aligned with the shaft hole 42L, while the pinion 36R and the corresponding washer 60R are aligned with the shaft hole 42R. Subsequently, the rods 240 and 188 are retracted, and the turn table 228 with the pinion shaft 34 accommodated in the groove 230 is moved by the positioning cylinder 236 from the shaft-receiving position indicated by solid line in FIG. 14 to the shaft-feeding position indicated by one-dot chain line. If the pin hole 47 is not detected at the end portion of the pinion shaft 34 on the side of the turn table 228 remote from the operator's side of the apparatus 12, the turn table 228 is rotated through 180° in the shaft-feeding position according to a signal from the control device 208 in response to a signal generated by a sensor (not shown) for detecting the pin hole 46.

Then, the cylinder 238 is again activated to advance the positioning/pushing rod 240, whereby the pinion shaft 34 is pushed out from the groove 230 of the turn table 228, and inserted into the differential case 10, through the shaft hole 42L, washer 60L, pinion 36L, pinion 36R, washer 36R and shaft hole 42R. The pushing rod 240 is retracted, and the turn table 228 is returned to the shaft-receiving position. In the meantime, the lock pin 44 delivered through the supply tube 196 one piece at a time is driven by the punch 197 into the pin holes 46, 47, by activation of the punching cylinder 198.

During the above operation to drive the lock pin 44, the pinion shaft 34 received in the channel member 22 of the posturing device 216 is positioned about its axis by the reciprocating movements of the channel member 222 by the reciprocating cylinder 224. This operation is followed by the activation of the pusher cylinder 214 to feed the new piece of the pinion shaft 34 from the supply tube 211 into the shaft holder 212, whereby the postured piece of the pinion shaft 34 in the channel member 222 of the posturing device 216 is pushed out from the channel member 222 into the groove 230 of the turn table 228 in the shaft-receiving position.

The second vertical cylinder 68 is then activated to elevate the second working head 70 to the original position, and the pallet 26 on the carriage 14 in the second assembling position is transferred by the rollers 18 onto the unloading conveyor 22. Upon detection by a sensor (not shown) of the transfer of the pallet 26 to the unloading conveyor 22, the reciprocating cylinder 16 is activated to return the carriage 14 back to the first assembling position of FIGS. 1 and 2. In the manner described above, one cycle of automatic assembling operations on the differential case 10 by the assembling apparatus 12 is completed.

As explained above, the present embodiment of the invention is adapted such that the pair of differential pinions 36L, 36R are rotatably supported by the pair of pinion supported devices 104L, 104R, within the differential case 10, at respective diametrically opposite positions of the case 10, or at respective positions which are symmetrical with each other with respect to the rotation axis B (vertical axis C) of the side gears 32U, 32D in a plane perpendicular to the axis B. In this condition, the pinions 36L, 36R are forced onto the lower side gear 32D with a suitable load, and this lower side gear 32D is rotated in one direction, for automatic meshing engagement of the pinions 36L, 36R with the upper side gear 32U as well as the lower side gear 32D. Upon completion of the meshing engagement of the pinions 36L, 36R with the side gears 32D, 32U, the pinions are automatically retained at the respective symmetrical positions with respect to the rotation axis B of the side gears 32. Therefore, the worker or operator of the apparatus 12 is not required to manipulate the pinions 36L, 36R, with a high level of skill, for meshing engagement with the side gears 32U, 32D, at the appropriate positions within the differential case 10.

In the illustrated embodiment, the upper side gear 32U is biased by its own weight toward the lower side gear 32D while the side gears 32U, 32D and the pinions 36L, 36R meshing with the side gears 32U, 32D are rotated about the axis B relative to the differential case 10, until the pinions 36L, 36R are brought into alignment with the shaft holes 42L, 42R, namely, located at the third angular position of FIG. 21. Therefore, the weight of the upper side gear 32U serves to force the pinions 36L, 36R and the part-spherical washers 60L, 60R against the inner surfaces 59 of the case 10, whereby the washers 60L, 60R are protected from displacement relative to the rear or outer end faces of the pinions 36L, 36R during rotation of the pinions 36L, 36R about the axis B relative to the inner surfaces 59. This arrangement assures automatic efficient and easy insertion of the pinion shaft 34 through the pinions 36L, 36R and the washers 60L, 60R.

The illustrated embodiment is further adapted such that one (156L, 156R) of the two pinion holders 154L, 154R and 156L, 156R which cooperate to rotatably support the pinion 36L, 36R is retracted away from the pinion 36L, 36R to permit the pinion 36L, 36R to be moved from the first angular position of FIG. 18 to the second angular position of FIG. 19, and the other pinion holder 156L, 156R is then retracted to permit the pinion 36L, 36R to be moved from the second angular position of FIG. 20 to the third angular position of FIG. 21 by the pinion pushing device 106L, 106R. This arrangement allows arcuate movement of the pinion 36L, 36R into alignment with the shaft holes 42L, 42R, through a space defined by the side gears 32U, 32D and the case 10, without interference of the pinion holders 154L, 154R, 156L, 156R and pinion pushing device 106L, 106R with the case 10. This feature thus facilitates the automatic insertion of the pinion shaft 34.

Thus, the present embodiment assures appreciably high efficiency of automatic assembling of the differential gear device 10, 32U, 32D, 34, 36L, 36R, 40U, 40D, 44, 60L, 60U, in as short as about 10 seconds for each differential case 10, with consistent assembling accuracy, without requiring a high level of skill of the worker. This short assembling time of about 10 seconds is considerably reduced as compared with the conventionally required time of about 55 seconds.

It is also noted that the pinion support devices 104L, 104R used in the present embodiment are adapted such that the gravity center of the pivoting unit 128L, 128R with the pinion 36L, 36R mounted thereon lies between the supporting horizontal pin 130L, 130R and the end of the unit 128L, 128R at which the .pinion 36L, 36R is mounted. This location of the gravity center of the pivoting unit 128L, 128R produces a moment which causes the pinion 36L, 36R to be forced .against the lower side gear 32D, during rotation of the side gear 32D for meshing with the pinion 36L, 36R, whereby the teeth of the side gear 32D and pinion 36L, 36R are protected from being damaged in the process of their meshing.

Further, the yieldable member 118L, 118R is permitted to be retracted by elastic deformation of the spring 120L, 120R, whereby the pinions 36L, 36R can be moved away from the lower side gear 32D, in the event of failure of the pinions 36L, 36R in properly meshing with the lower side gear 32U. Thus, the present embodiment is advantageous in avoiding the otherwise possible damage of the pinions 36L, 36R in the process of meshing engagement with the side gear 32D.

While the present invention has been described in its presently preferred embodiment by reference to the accompanying drawings, it is to be understood that the invention may be otherwise embodied.

In the illustrated embodiment, the differential side gear 32D is rotated in one direction for meshing engagement of the differential pinions 36L, 36R with the side gear 32D. However, the side gear 32D may be rotated in opposite directions alternately for meshing engagement with the pinions 36L, 36R.

Although the illustrated embodiment is adapted such that the pinion pushing heads 111L, 111R are advanced after the still advanced pinion holders 154L, 154R have been retracted, the pinion pushing heads 111L, 111R may be first advanced and then the pinion holders 154L, 154R are retracted.

In the illustrated embodiment, the weight of the upper side gear 32U is utilized as a load for biasing the upper and lower side gears 32U and 32D toward each other and onto the pinions 36L, 36R, in order to prevent the downward displacement or separation of the part-spherical washers 60L, 60R relative to or away from the pinions 36 during rotation of the pinions 36 and side gears 32 about the axis B (axis C) relative to the differential case 10 placed in the first assembling position. However, the first working head 66 may be provided with a suitable spring for biasing the upper side gear 32D in the downward direction. In this case, the weight of the upper side gear 32D and the biasing force of the spring constitute a device for biasing the upper and lower side gears 32U, 32D toward each other.

While the illustrated embodiment is adapted to utilize the weight of the upper side gear 32U or the pressure member 192 of the second working head 70 to bias the upper and lower side gears 32U, 32D toward each other in the first and second assembling positions, for preventing the displacement of the washers 60L, 60R relative to the pinions 36L, 36R. However, the lower side gear 32D may be biased by any suitable biasing means toward the upper side gear 32U.

Although the cylinders 142L, 132R are provided in the illustrated embodiment, these cylinders are not essential.

It is to be understood that the illustrated embodiment and the above modifications are given by way of example, only, and that the present invention may be embodied with various other changes, which may occur to those skilled in the art, without departing from the spirit and scope of the invention defined in the following claims.

What is claimed is:

1. A method of assembling a differential gear device including a differential case with a chamber formed therein, and components which are accommodated in said chamber and which include a pair of opposed differential side gears, a pair of opposed differential pinions interposed between and meshing with said side gears, and a differential pinion shaft for rotatably supporting said pinions, said differential case being adapted to be disposed in a differential assembly, rotatably with a ring gear about a first axis, said side gears being rotatable about said first axis, while said differential pinions being rotatable about a second axis perpendicular to said first axis, said case having a pair of openings which communicate with said chamber and are open to an external space outside said case and which are opposed to each other in a direction perpendicular to said second axis, in a plane parallel to said second axis and perpendicular to said first axis, said method comprising the steps of:

introducing said pinions into said chamber through said pair of openings, respectively, and rotatably holding said pinions between said differential side gears disposed within said chamber, at respective symmetrical positions which are symmetrical with each other with respect to said first axis in said plane;

rotating one of said side gears about said first axis; and effecting meshing engagement of said pinions with said pair of side gears, while holding said pinions at said respective symmetrical positions.

2. A method according to claim 1, wherein said step of rotating said one side gear comprises rotating said one side gear in a predetermined one direction, and said step of effecting meshing engagement comprises forcing said pair of pinions onto said one side gear during rotation of said one side gear in said predetermined one direction, to thereby effect meshing engagement of said pinions with said one side gear.

3. A method according to claim 2, further comprising the steps of positioning said differential case such that said first axis extends in a vertical direction, and positioning said pair of side gears such that said pair of side gears are opposed to each other in said vertical direction, and wherein said step of forcing said pair of pinions onto said one side gear comprises placing said pinions on a lower one of said side gears such that a weight of said pinions partially acts on said lower one side gear, with said pinions being spaced apart from an upper one of said side gears.

4. A method according to claim 2, wherein said step of rotating said one side gear further comprises rotating said one side gear in a direction opposite to said one predetermined one direction, after said pinions have meshed with said one side gear, and said step of effecting meshing engagement comprises bringing said pinions into contact with the other of said side gears to thereby effect meshing engagement of said pinions with said other side gear.

5. A method according to claim 1, further comprising the step of rotating said side gears and said pinions after said meshing engagement thereof, relative to said differential case about said first axis, until said pinions are aligned with said second axis.

6. A method according to claim 5, further comprising the step of biasing said pair of side gears toward each other to thereby force said pinions toward an inner surface which defines said chamber of said differential case, while said side gears and said pinions are rotated about said first axis relative to said case.

7. A method according to claim 6, further comprising the steps of positioning said differential case such that said first axis extends in a vertical direction, and positioning said pair of side gears such that said pair of side gears are opposed to each other in said vertical direction, said method further comprising the step of holding an upper one of said side gears until said meshing engagement of said side gears and said pinions is completed, and releasing said upper side gear after said meshing engagement such that a weight of said upper one side gear acts on said pair of pinions, whereby said pinions are biased toward said inner surface of said case in opposite directions as seen in said plane.

8. A method according to claim 6, wherein said step of introducing said pinions into said chamber through said pair of openings comprises introducing said pinions together with a pair of washers such that said pair of washers are interposed between said inner surface of said case and said pair of pinions, respectively, and said step of biasing said pair of side gears toward each other comprises biasing said pair of pinions to force said pair of washers onto said inner surface of said case.

9. A method according to claim 5, wherein said step of rotating said side gears and said pinions relative to said case about said first axis comprises:

rotatably holding each of said pinions in a first angular position about said first axis, with a first pinion holder and a second pinion holder extending through a corresponding one of said pair of openings into said chamber, such that said second pinion holder is located adjacent to one of opposite ends of said corresponding one opening as seen in a direction of rotation of said pinions about said first axis;

retracting said second pinion holder away from said each pinion while leaving said each pinion within said chamber in said first angular position;

rotating said side gears and said pinions relative to said case about said first axis to move said pinions from said first angular position to a second angular position in which said first pinion holder is located adjacent to said one end of said corresponding opening;

retracting said first pinion holder away from said each pinion while leaving said each pinion within said chamber in said second angular position; and rotating said side gears and said pinions relative to said case about said first axis to move said pinions from said second angular position to a third angular position in which said pinions are aligned with said second axis.

10. A method according to claim 9, wherein said step of rotating said side gears and said pinions to move said pinions from said second angular position to said third angular position comprises bringing a pair of pinion pushing heads into abutting contact with said pair of pinions in said second angular position, respectively, and moving said pinion pushing heads to move said pinions to said third angular position after said first pinion holder is retracted from said each pinion.

11. A method according to claim 5, wherein said differential case has a pair of shaft holes which communicate with said chamber and are open to said external space and which are opposed to each other in alignment with said second axis, said method further comprising the step of inserting said pinion shaft through said pair of shaft holes and said pair of pinions which are aligned with said second axis.

12. A method according to claim 11, further comprising the step of inserting a positioning rod through one of said pair of shaft holes and a corresponding one of said pinions, to align said corresponding one pinion relative to said one shaft hole.

13. A method according to claim 11, further comprising the step of inserting a lock pin through a first pin hole formed in said differential case and a second pin hole formed through one end portion of said pinion shaft.

14. A method according to claim 11, wherein said step of rotating said side gears and said pinions about said first axis until said pinions are aligned with said second axis is effected with said differential case placed in a first assembling position, while said step of inserting said pinion shaft is effected with said differential case placed in a second assembling position which is spaced apart from said first assembling position.

15. A method according to claim 1, wherein said differential case further has a pair of axle holes which communicate with said chamber and are open to said external space outside said case and which are opposed to each other in alignment with said first axis, further comprising the steps of:
positioning said differential case such that said first axis extends in a vertical direction; and
holding an upper one of said side gears with a jig partially inserted through an upper one of said pair of axle holes, until said upper side gear has meshed with said pinions.

16. A method according to claim 15, wherein said step of rotating said one side gear about said first axis comprises inserting a chucking device through a lower one of said pair of axle holes, to chuck a corresponding lower one of said side gears as said one side gear, and rotating said chucking device to rotate said lower side gear.

17. An apparatus for assembling a differential gear device including a differential case with a chamber formed therein, and components which are accommodated in said chamber and which include a pair of opposed differential side gears, a pair of opposed differential pinions interposed between and meshing with said side gears, and a differential pinion shaft for rotatably supporting said pinions, said differential case being adapted to be disposed in a differential assembly, rotatably with a ring gear about a first axis, said side gears being rotatable about said first axis, while said differential pinions being rotatable about a second axis perpendicular to said first axis, said case having a pair of openings which communicate with said chamber and are open to an external space outside said case and which are opposed to each other in a direction perpendicular to said second axis, in a plane parallel to said second axis and perpendicular to said first axis, said apparatus comprising:
a pinion support device for introducing said pinions into said chamber through said pair of openings, respectively, and rotatably holding said pinions between said differential side gears disposed within said chamber, at respective symmetrical positions which are symmetrical with each other with respect to said first axis in said plane;
a side gear rotating device for rotating one of said side gears about said first axis; and
a gear meshing device for effecting meshing engagement of said pinions with said pair of side gears, while holding said pinions at said respective symmetrical positions.

18. An apparatus according to claim 17, further comprising a controller for controlling said side gear rotating device so as to rotate said one side gear in a predetermined one direction, and said gear meshing device comprises a pinion pressing device, said controller operating said pinion pressing device to force said pair of pinions onto said one side gear during rotation of said one side gear in said predetermined one direction, for thereby effecting meshing engagement of said pinions with said one side gear.

19. An apparatus according to claim 18, wherein said side gear rotating device includes:
a chucking device for chucking said one side gear; and
a drive device for rotating said chucking device to thereby rotate said one side gear.

20. An apparatus according to claim 18, wherein said pinion support device includes:
a pair of pinion holders for rotatably holding said pair of pinions; and
a pair of actuators for moving said pinion holders between an advanced position within said chamber and a retracted position in said external space.

21. An apparatus according to claim 20, wherein said pinion pressing device includes:
a pair of pivoting units on which said pair of pinion holders are mounted, respectively, such that each of said pair of pinions is rotatably supported at one of opposite ends of a corresponding one of said pivoting units, each of said pivoting units being pivotable about a pivot axis between a first position for meshing engagement with said one side gear, and a second position for meshing engagement with said pair of side gears; and
a pair of brackets for pivotally supporting said pair of pivoting units, such that a gravity center of a mass consisting of each of said pivoting units and a corresponding one of said pinions held by said pinion holders lies on one of opposite sides of said pivot axis which is nearer to said one of opposite ends of said corresponding pivoting unit than to the other of said opposite ends, whereby said pinions are forced onto said one side gear when said pivoting units are placed in said first position.

22. An apparatus according to claim 21, wherein said differential case is positioned such that said first axis extends in a vertical direction, and said pair of side gears are disposed within said chamber such that said pair of side gears are opposed to each other in said vertical direction, and wherein said pivoting units are pivotable in a vertical plane, so that a weight of said pinions partially acts on a lower one of said side gears, with said pinions being spaced apart from an upper one of said side gears, when said pivoting units are placed in said first position.

23. An apparatus according to claim 18, wherein said controller operates said side gear rotating device to rotate said one side gear in a direction opposite to said one predetermined one direction, after said pinions have meshed with said one side gear during rotation of said one side gear in said predetermined one direction, and said gear meshing device comprises a device for bringing said pinions into contact with the other of said side gears to thereby effect meshing engagement of said pinions with said other side gear.

24. An apparatus according to claim 17, further comprising a rotating device for rotating said side gears and said pinions after said meshing engagement thereof, relative to said differential case about said first axis, until said pinions are aligned with said second axis.

25. An apparatus according to claim 24, further comprising biasing means for biasing said pair of side gears toward each other to thereby force said pinions toward an inner surface which defines said chamber of said differential case, while said side gears and said pinions are rotated by said rotating device, about said first axis relative to said case.

26. An apparatus according to claim 25, wherein said differential case is positioned such that said first axis extends in a vertical direction, and said pair of side gears are positioned such that said pair of side gears are opposed to each other in said vertical direction, said apparatus further comprising holding means for holding an upper one of said side gears until said meshing engagement of said side gears and said pinions is completed, and releasing said upper side gear after said meshing engagement such that a weight of said upper one side gear acts on said pair of pinions, whereby said pinions are biased toward said inner surface of said case in opposite directions as seen in said plane, said weight of said upper side gear serving as said biasing means.

27. An apparatus according to claim 24, wherein said rotating device comprises:
a first pinion holder and a second pinion holder each of which is movable between an advanced position for rotatably holding each of said pinions within said chamber of said case, and a retracted position in said external space, said first and second pinion holders being movable to said advanced position through a corresponding one of said pair of openings;
a first and a second actuator for operating said first and second pinion holders, respectively;
a drive source for rotating said side gears and said pinions relative to said case about said first axis, to move said pinions through a first and a second angular position about said first axis, to a third angular position about said third axis, said pinions when placed in said third angular position being aligned with said second axis; and
a controller for controlling said first and second pinion holders, said first and second actuators and said drive source.

28. An apparatus according to claim 27, wherein said controller controls said first and second actuators so as to hold said first and second pinion holders in said advanced position while said pinions are placed in said first angular position, such that said second pinion holder is located adjacent to one of opposite ends of said corresponding one opening as seen in a direction of rotation of said pinions about said first axis,
said controller retracting said second pinion holder from said advanced position, away from said each pinion while leaving said each pinion within said chamber and holding said pinion in said first angular position,
said controller operating said drive source to rotate said side gears and said pinions relative to said case about said first axis to move said pinions from said first angular position to said second angular position, so that said first pinion holder is located adjacent to said one end of said corresponding opening,
said controller then retracting said first pinion holder away from said each pinion while leaving said each pinion within said chamber and holding said pinion in said second angular position,
said controller further rotating said side gears and said pinions relative to said case about said first axis to move said pinions from said second angular position to said third angular position for alignment of said pinions with said second axis.

29. An apparatus according to claim 28, wherein said rotating device further comprises a pair of pinion pushing heads for moving said pinions from said second angular position to said third angular position, said controller operating said pair of pinion pushing heads for abutting contact with said pair of pinions in said second angular position, respectively, and then activating said drive source to moving said pinion pushing heads about said first axis for thereby moving said pinions to said third angular position after said first pinion holder is retracted from said each pinion.

30. An apparatus according to claim 24, wherein said differential case has a pair of shaft holes which communicate with said chamber and are open to said external space and which are opposed to each other in alignment with said second axis, said apparatus further comprising a shaft inserting device for inserting said pinion shaft through said pair of shaft holes and said pair of pinions when said pinions are aligned with said second axis.

31. An apparatus according to claim 30, further comprising a lock pin inserting device for inserting a lock pin through a first pin hole formed in said differential case and a second pin hole formed through one end portion of said pinion shaft.

32. An apparatus according to claim 30, further comprising a pallet on which said differential case is mounted, and a reciprocating device for moving said pallet between a first assembling position and a second assembling position, said pinion support device, said side gear rotating device, said gear meshing device and said rotating device being located in said first assembling position, while said shaft inserting device is located in said second assembling position.

33. An apparatus according to claim 17, wherein said differential case further has a pair of axle holes which communicate with said chamber and are open to said external space outside said case and which are opposed to each other in alignment with said first axis, said apparatus further comprising:
a fixture for positioning said differential case such that said first axis extends in a vertical direction; and
a gear holding jig attached to said case and including a portion which is inserted through an upper one of said pair of axle holes, for holding an upper one of said side gears within said chamber, until said upper side gear has meshed with said pinions.

* * * * *